United States Patent
Van Geem et al.

(10) Patent No.: US 11,465,116 B2
(45) Date of Patent: Oct. 11, 2022

(54) STATOR-ROTOR VORTEX CHAMBER FOR MASS AND/OR HEAT TRANSFER PROCESSES

(71) Applicant: UNIVERSITEIT GENT, Ghent (BE)

(72) Inventors: Kevin Van Geem, Kruisem (BE); Arturo Gonzalez Quiroga, Puerto Colombia (CO); Guy Marin, Ghent (BE); Vladimir Shtern, Houston, TX (US); Maria Pantzali, Aberdeen (GB)

(73) Assignee: UNIVERSITEIT GENT, Ghent (BE)

( * ) Notice: Subject to any disclaimer, the term of this patent is extended or adjusted under 35 U.S.C. 154(b) by 190 days.

(21) Appl. No.: 16/627,430

(22) PCT Filed: Jun. 27, 2018

(86) PCT No.: PCT/EP2018/067286
§ 371 (c)(1),
(2) Date: Dec. 30, 2019

(87) PCT Pub. No.: WO2019/002385
PCT Pub. Date: Jan. 3, 2019

(65) Prior Publication Data
US 2020/0147576 A1   May 14, 2020

(30) Foreign Application Priority Data
Jun. 29, 2017 (EP) .................................... 17178756

(51) Int. Cl.
*B01J 8/38* (2006.01)
*B01J 19/18* (2006.01)
(Continued)

(52) U.S. Cl.
CPC ............. *B01J 8/386* (2013.01); *B01J 8/1818* (2013.01); *B01J 19/0073* (2013.01);
(Continued)

(58) Field of Classification Search
None
See application file for complete search history.

(56) References Cited

U.S. PATENT DOCUMENTS

| 2,544,149 A | 3/1951 | Foderl |
| 4,092,013 A * | 5/1978 | Staaf ..................... B01F 5/0057 366/165.4 |

(Continued)

FOREIGN PATENT DOCUMENTS

| EP | 1847314 A1 | 10/2007 |
| JP | S5520654 A | 2/1980 |

(Continued)

OTHER PUBLICATIONS

European Search Report from EP Application No. 17178756.7, dated Dec. 1, 2017.
(Continued)

*Primary Examiner* — Jennifer A Leung
(74) *Attorney, Agent, or Firm* — Workman Nydegger

(57) ABSTRACT

A device for bringing a target medium into contact with a carrier fluid comprises a chamber comprising a circumferential wall, a bottom wall and a top wall forming an enclosure for containing the target medium while contacting the carrier fluid, the chamber being substantially rotationally symmetric with respect to an axis of symmetry and adapted for remaining mechanically static in operation of the device. The device comprises a fluid inlet for injecting the carrier fluid into the chamber in a substantially tangential direction with respect to an inner surface of the circumferential wall, and an outlet. The device comprises a fluid distributor in the chamber for enabling the injected carrier fluid to pass through the distributor in a substantially inward radial direction, the distributor being substantially rotationally symmetric and adapted for rotating around the axis when (Continued)

driven by a transfer of momentum between the injected carrier fluid and the distributor.

14 Claims, 20 Drawing Sheets

(51) Int. Cl.
    *B04C 9/00*     (2006.01)
    *B01J 8/18*     (2006.01)
    *B01J 19/00*     (2006.01)

(52) U.S. Cl.
    CPC ............. *B01J 19/1806* (2013.01); *B04C 9/00* (2013.01); *B01J 2208/0092* (2013.01); *B01J 2208/00884* (2013.01); *B01J 2208/00938* (2013.01)

(56) References Cited

U.S. PATENT DOCUMENTS

| | | | | |
|---|---|---|---|---|
| 4,400,275 A * | 8/1983 | Ramshaw | ............... | B01D 47/16 210/497.1 |
| 4,541,851 A * | 9/1985 | Bosquain | ........... | B01D 53/0438 96/126 |
| 6,280,079 B1 * | 8/2001 | Yang | ................... | B01F 7/00916 366/263 |
| 6,892,475 B2 * | 5/2005 | Wakamatsu | ............... | B01J 2/16 34/582 |
| 7,585,665 B2 * | 9/2009 | Iiyama | ................... | A23K 10/32 435/289.1 |
| 2015/0343453 A1 * | 12/2015 | Czekai | ................... | B02C 23/16 241/5 |

FOREIGN PATENT DOCUMENTS

| | | |
|---|---|---|
| JP | 2005161222 A | 6/2005 |
| WO | 2009087193 A1 | 7/2009 |
| WO | 2013170321 A1 | 11/2013 |
| WO | WO-2015055119 A1 * | 4/2015 ............ B01D 45/14 |
| WO | 2017031556 A1 | 3/2017 |

OTHER PUBLICATIONS

International Search Report and Written Opinion from PCT Application No. PCT/EP2018/067286, dated Nov. 10, 2018.

Office Action from corresponding Japanese Application No. 2019-571329, dated Mar. 8, 2022.

* cited by examiner 271
273

272
274

275

STATOR-ROTOR VORTEX CHAMBER FOR MASS AND/OR HEAT TRANSFER PROCESSES

FIELD OF THE INVENTION

The invention relates to the field of interfacial momentum, mass and/or energy transfer between phases in reactive and non-reactive processes. More specifically it relates to a device and method for bringing a target medium into contact with a carrier fluid, e.g. for use in a process that requires intensive interfacial momentum, mass and/or energy exchange between the carrier fluid and the target medium.

BACKGROUND OF THE INVENTION

It is known in the art that reactive and non-reactive processes may require intensive interfacial mass and energy exchange between material phases, e.g. between a solid or liquid target medium and a liquid or gaseous carrier. Furthermore, contact times between the target medium and the carrier fluid may be required that are in the order of milliseconds. Such processes can find application in, for example, pharmaceutical, chemical and petrochemical, food, environmental and energy conversion industries. Examples are, but are not limited to, drying, coating, pyrolysis, gasification, combustion, propulsion, polymerization, reforming, fluid catalytic cracking, $NO_x$ catalytic reduction, oxidative coupling of methane, removal of $NO_x$ and $SO_2$ from gases and waste water treatment.

For example, processes are known in the art in which a gaseous stream acts as the carrier phase while a solid, a liquid or a mixture thereof constitutes the secondary phase or phases, i.e. the target medium. The hydrodynamics of such processes may depend on the product of the buoyancy terms, e.g. on the density difference between the phases, and the local acceleration.

The interfacial mass and energy exchange may be strongly influenced by the relative velocity, or slip velocity, between the phases. When the phases are brought into contact under the mere influence of the earth gravitational field the slip velocity will be restricted to a narrow range. After exceeding a predetermined slip velocity, the contact between the phases cannot be sustained due to lack of balance among the forces acting upon the system.

It is known in the art that the slip velocity can be increased by replacing the gravitational field by a centrifugal field, e.g. with centrifugal accelerations exceeding the acceleration of gravity, to enhance the interfacial mass and energy exchange.

It is also known in the art to perform gas-solid processes that require intensive interfacial mass, momentum and/or energy exchange and/or short contact times in gravitational fluidized beds. Solid particles are transformed into a fluid-like state in which the frictional force between particle and fluid counterbalances the weight of the particles. Different fluidization regimes may exist, typically starting from a bubbling bed in which there is no net transport of solids. Increasing the gas-solid slip velocity leads to a transported bed in which both gas and solids move upwards and finally leave the system.

However, methods of gravitational gas-solid fluidization as known in the art may have the disadvantage that the gas-solid slip velocity cannot exceed the terminal velocity of the particles in the gravitational field. Furthermore, the width-to-height ratio of the bed needs to be sufficiently small to avoid large-scale non-uniformities like channeling and slugging. Also, meso-scale non-uniformities, such as bubbles and clusters, may occur which can be detrimental to the interfacial transfer of energy, momentum and/or energy and which can generate hot spots. Furthermore, the bed void fraction may increase gradually as the bed expands, e.g. exceeding 90% in the transported bed regime. Also, when inter-particle van der Waals forces dominate over drag and gravitational forces, a fluidized bed might not be obtainable, e.g. such as for fine or light cohesive powders having a particle size on the order of 10 μm.

It is also known in the art to perform gas-liquid and gas-liquid-solid processes that require intensive interfacial mass and energy exchange and short contact times in bubble columns and slurry bubble columns. Bubble columns are cylindrical vessels in which gas is injected as bubbles through a distributor, or sparger, into a liquid or into a suspension of fine solids in a liquid. The gas flows either cocurrently or countercurrently to the liquid flow direction. For the gas-liquid contact, different flow regimes exist, typically starting from a homogeneous bubbly flow in which the superficial gas velocity is lower than 0.05 m/s. The superficial gas velocity is directly proportional to the relative or slip velocity. Increasing the superficial gas velocity leads either to a slug-type flow or a heterogeneous bubble flow depending on the cross-sectional area of the column, e.g. a churn-turbulent regime.

However, gravitational gas-liquid and gas-liquid-solid bubble column methods may have the disadvantage that, for a column of a given cross-sectional area, the homogeneous bubbly flow regime features relatively small bubbles of uniform size but the gas throughput is limited to keep the superficial gas velocity below 0.05 m/s. In the homogeneous bubbly flow regime, good results in terms of mass transfer can be achieved, but industrial bubble columns may typically operate under heterogeneous flow conditions, which leads to excessive column heights. Under these conditions, bubble terminal velocities, interfacial shear stresses and flooding mass fluxes may all decrease, while bubble sizes may tend to increase.

For gas-solid processes it is furthermore known to implement a centrifugal fluidized bed. For example, in a rotating fluidized bed, the rotation of a cylindrical chamber, having two flat end walls and a perforated cylindrical outer wall, may be driven by applying external electrical work. The carrier gas may flow radially inward through the perforations, then reaches the solid bed that rotates at substantially the same rotational velocity as the chamber, and finally flows out through a gas exit at the center of one of the end walls. Some disadvantages of this approach may be significant particle entrainment in the case of fine cohesive powders, a high additional energy consumption to maintain the rotation of the chamber, a limitation of the centrifugal force by the maximum rotational velocity of a driven shaft.

Likewise, it is known in the art to enhance gas-liquid and gas-liquid-solid processes that require intensive interfacial mass and energy exchange and short contact times by the application of centrifugal forces. For example, in a rotor stator spinning disk reactor, centrifugal forces and high-shear forces act simultaneously on the multi-phase system. In such system, a spinning disk with a liquid film on the rotor is separated from a stator, by a typical gap on the order of millimetres. However, it is a disadvantage of such approaches that a high energy consumption may be implied in order to maintain the shear rate and the rotation of the rotor. Furthermore, due to the geometry, only a limited gas throughput and phase separation tendency may be achieved.

For gas-solid processes, it is also known to implement a centrifugal fluidized bed by using the energy of the carrier gas to sustain the rotating solid bed into a cylindrical chamber, which may be referred to as a rotating fluidized bed in a static geometry or a gas-solid vortex unit. In such approach, a static cylindrical chamber may have tangential inlet slots evenly distributed on the cylindrical outer wall. The carrier gas may enter at velocities typically exceeding 50 m/s, deaccelerates after transferring momentum to the solids, and finally flows out through a gas exit at the center of one of the end walls. Disadvantages of this approach may be that particle entrainment may be caused by near static-wall gas jets, only a relatively low rotational velocity may be obtained due to excessive friction between the solid bed and the static walls and a high energy consumption may be implied due to the excessive gas-to-solid mass flow rate ratio required to sustain the rotating bed. Likewise, a centrifugal bubbling reactor, as also known in the art, resembles the gas-solid vortex unit mentioned hereinabove. In such reactor, a highly dispersed gas-liquid mixture is created. However, the same disadvantages as mentioned hereinabove may apply to the gas-solid variant.

SUMMARY OF THE INVENTION

It is an object of embodiments of the present invention to provide good and efficient means and methods for enabling reactive and/or non-reactive fluid-solid, fluid-liquid and fluid-liquid-solid processes that require intensive interfacial momentum, mass and/or energy exchange between a carrier fluid phase and a target medium, e.g. while requiring contact times in the order of milliseconds.

The above objective is accomplished by a method and device according to the present invention.

In a method and/or device according to embodiments of the present invention, a distributor for a target medium may be incorporated and/or used, which can freely rotate around the device axis, which may be connected to a static part of the device, e.g. by bearings, and which can be driven by the rotational velocity of a carrier fluid, which fluid also can penetrate the distributor, e.g. through a perforated circumferential wall thereof.

It is an advantage of embodiments of the present invention that a good mass and energy interfacial exchange efficiency can be achieved. For example, for applications involving a solid phase, fluid jets, e.g. gas jets, in a device or method in accordance with embodiments of the present invention may reduce the gas boundary layer surrounding the particles. Furthermore, high gas-solid slip velocities may be achieved. Therefore, a good interfacial mass and energy transfer can be achieved.

It is an advantage of embodiments of the present invention that a good centrifugal acceleration of the multi-phase system can be achieved, e.g. exceeding gravity multiple times, e.g. more than ten times, and, therefore, a good interfacial exchange of momentum, mass and/or energy can be achieved.

It is an advantage of embodiments of the present invention that mass and energy transfer processes are not limited by the limited slip velocities that are implied by relying on the gravitational force for at least partially equilibrating a gas-solid drag force.

It is an advantage of embodiments of the present invention that fluid-solid, fluid-liquid and/or fluid-solid/liquid slip velocities can be achieved that significantly exceed those achieved by (at least one) gravitational fluidized bed as known in the art, e.g. due to the application of a large centrifugal force. By enabling the solid bed, liquid layer or liquid-solid layer to rotate along with a rotor, i.e. the distributor, tangential velocities can be reached at an outer circumferential part of the rotor that are advantageously close to the carrier fluid injection velocity.

It is an advantage of embodiments of the present invention that externally supplied power is efficiently used in operation of a device or application of a method in accordance with embodiments of the present invention.

For example, the power supplied by injection of the carrier fluid, e.g. the kinetic energy of the carrier fluid, can be efficiently converted into rotational kinetic energy of the distributor, e.g. the rotor part of the device, and, thus, to the solid bed, liquid layer or liquid-solid layer, in operation of the device.

It is an advantage of embodiments of the present invention that a good mass flow rate range of the carrier phase can be achieved, e.g. in an energy efficient process.

It is an advantage of embodiments of the present invention that no external electrical work needs to be applied to drive a shaft. It is a further advantage that high rotational velocities can be achieved. It is also an advantage that a distributor in a device in accordance with embodiments may be rotating at high rotational velocities, and this rotation may be efficiently sustained, due to low friction losses.

It is an advantage of embodiments of the present invention that a broad carrier phase operation range can be achieved.

For example, centrifugal accelerations exceeding ten times the acceleration of gravity can be achieved, e.g. for a lower carrier fluid flow rate, e.g. carrier gas flow rate, than required for at least one device or method as known in the art.

It is an advantage of embodiments of the present invention that particle entrainment can be reduced, e.g. when compared to at least one prior art approach, e.g. particularly for fine cohesive powders. For example, effects of near end-wall fluid jets may be reduced that might cause particle entrainment.

It is an advantage of embodiments of the present invention that tangential carrier fluid injection may reduce and/or avoid entrainment of fine particles, e.g. ash, which can reduce pollution in combustion applications. The latter may furthermore lead to a good carrier phase operation range.

It is an advantage of embodiments of the present invention that detrimental meso-scale non-uniformities can be avoided, reduced and/or controlled.

It is an advantage of embodiments of the present invention that detrimental meso-scale non-uniformities and particle entrainment can be avoided and/or reduced without requiring the addition of flow pattern modifiers, such as fines or oils, to suppress bubbling and to minimize particle entrainment. However, embodiments of the present invention may nonetheless comprise the use of such flow pattern modifiers to further reduce meso-scale non-uniformities and/or particle entrainment.

It is an advantage of embodiments of the present invention that detrimental meso-scale non-uniformities and particle entrainment can be avoided and/or reduced using a carrier fluid of moderate viscosity and/or density, and/or using a relatively low operating pressure, and/or without relying on a periodic pulsation of the carrier fluid flow. However, embodiments of the present invention do not necessarily exclude the additional use of such solutions as known in the art.

It is an advantage of embodiments of the present invention that a substantially compact and/or uniform solid bed, liquid layer or liquid-solid layer can be achieved, e.g. due to an enhanced radially outward centrifugal force that opposes the radial inward fluid-solid, fluid-liquid or fluid-liquid-solid drag force.

It is an advantage of embodiments of the present invention that inertial and drag forces can be self-balanced, thus allowing a simple process control.

It is an advantage of embodiments of the present invention that, for applications involving a solid phase, a good control can be achieved over the mechanical integrity of solid particles, e.g. the mechanical integrity of particles can be preserved by an advantageously low attrition. For example, preserving a good mechanical integrity of the particles may be advantageous in applications where catalysts or gas absorbers are used.

It is an advantage of embodiments of the present invention that that a strong centrifugal field may be used to effectively and efficiently sustain a rotating solid bed, liquid layer or liquid-solid layer within a wide carrier fluid mass flow rate range, e.g. a wide gas mass flow rate range.

It is an advantage of embodiments of the present invention that a solid bed may nearly match the velocity of the distributor, i.e. the rotor, such that particle-particle and particle-wall collisions can be reduced.

It is an advantage of embodiments of the present invention that a cylindrical chamber having a low height relative to its diameter can be efficiently used, e.g. having a height-to-diameter ratio in the range of 0 to 5, e.g. in the range of 0 to 3, e.g. in the range of 0 to 1, or even in the range of 0 to 0.5. It is an advantage of embodiments that a disengagement section, in which the cross-sectional area of the chamber increases substantially, is not required. Therefore, a compact solution can be provided. Nonetheless, embodiments of the present invention do not necessarily exclude larger height-to-diameter ratios, e.g. above 5, and/or do not necessarily exclude a chamber comprising a disengagement section.

It is an advantage of embodiments of the present invention that a rotating solid bed, liquid layer or liquid-solid layer, in operation of the device or in application of the method in accordance with embodiments, may grow in the radial direction towards the centre of the chamber, e.g. occupying different radial positions up to around 40% of the chamber radius.

By advantageously injecting a fluid tangentially into the chamber through a single inlet, or a plurality of inlets, a rotor, i.e. the fluid distributor, can be efficiently driven. Particularly, the rotor can be, advantageously, rotatably mounted using a low-friction bearing. Thus, a high centrifugal acceleration can efficiently achieved.

It is an advantage of embodiments of the present invention that rotating parts, in operation of a device or application of a method in accordance with embodiments of the present invention, can be limited to (e.g. to only) the distributor that advantageously can support the rotating solid bed, liquid layer or liquid-solid layer while also shaping the incident carrier fluid flux. Thus, friction of the rotating bed, fluid layer or fluid-solid layer can be advantageously low.

It is an advantage of embodiments of the present invention that it is not required to use a narrow gap between a rotor part and a stator part to generate high-shear forces, e.g. a narrow gap on the orders of millimetres, e.g. less than 15 mm, e.g. less than 10 mm, e.g. less than 5 mm, between the rotor and the stator. However, it is also an advantage of embodiments of the present invention that a narrow gap between the rotor and the stator part may be used generate high-shear forces to drive the rotation of the rotor part, e.g. in combination with short fin structures on the rotor or even in the absence of such fin structures.

In a first aspect, the present invention relates to a device for bringing a target medium into contact with a carrier fluid in a process that requires intensive interfacial momentum, mass and/or energy exchange between the carrier fluid and the target medium. The device comprises a chamber that comprises a circumferential wall, a bottom wall and a top wall, configured such that the chamber forms an enclosure for containing the target medium while contacting the carrier fluid in operation of the device, e.g. the chamber is adapted for forming an enclosure for containing the target medium in operation of the device, e.g. the circumferential wall, the bottom wall and the top wall are arranged such that an enclosure is formed for containing the target medium in operation of the device.

The chamber is substantially rotationally symmetric with respect to an axis of symmetry, for example the chamber may generally have a rotationally symmetric shape, e.g. may be rotationally symmetric insofar an asymmetry due the at least one fluid inlet interrupting the circumferential wall is disregarded and/or insofar trivial deviations from rotational symmetry are ignored that do not significantly affect the function and/or operation of the device. For example, the chamber may be generally circular and/or cylindrical in shape.

The chamber is adapted for remaining, e.g. configured to remain, mechanically static in operation of the device, e.g. particularly is not adapted for rotating or configured to rotate with respect to an external static frame of reference.

The device comprises at least one fluid inlet for injecting the carrier fluid under pressure into the chamber, e.g. under a pressure difference, e.g. for injecting the carrier fluid when a pressure difference is applied between the chamber and the at least one fluid inlet in operation of the device.

The at least one fluid inlet is adapted for injecting, e.g. configured to inject, e.g. arranged such as to inject, the carrier fluid into the chamber in a substantially tangential direction with respect to an inner surface of the circumferential wall. For example, the substantially tangential direction, e.g. or the tangential direction, may refer to a distribution of the injection over directions at the opening that has a major tangential component, e.g. a predominant tangential component, for example such that the injected flow velocity in a tangential direction is at least 10 times larger than the injected flow velocity in a radial direction.

The device also comprises an outlet for letting the carrier fluid flow out of the chamber, e.g. for collecting the carrier fluid from the chamber.

In embodiments of the present invention, the substantially tangential direction may, however, comprise an axial component, e.g. to improve particle mixing in the axial direction.

Tangential, radial and axial may refer to a cylindrical coordinate system or cylindrical directional reference system in which the axial orientation may be identified with the axis of symmetry.

The device also comprises a fluid distributor arranged in the chamber, in which the fluid distributor is adapted for enabling the injected carrier fluid to pass through the distributor in a substantially inward radial direction with respect to the axis of symmetry. Thus, the fluid distributor may be configured to, e.g. arranged such as to, enable the injected carrier fluid to pass through the distributor in a substantially inward radial direction with respect to the axis of symmetry. For example, the substantially inward radial direction, e.g. or the inward radial direction, may refer to a distribution of the flow velocity near, in or through the distributor over directions that has a major inward oriented radial component The distributor is substantially rotationally symmetric with respect to the axis of symmetry, for example the distributor may generally have a rotationally symmetric shape, e.g. may be rotationally symmetric insofar an asymmetry insofar trivial deviations from rotational symmetry are ignored that do not significantly affect the function and/or operation of the device. For example, the distributor may have the shape of a surface of revolution, e.g. may be generally circular, cylindrical or toroidal in shape.

The distributor is furthermore adapted for rotating, e.g. configured to or arranged to rotate, around the axis of symmetry. This rotation is driven by a transfer of momentum between the injected carrier fluid and the distributor in operation of the device, e.g. while the distributor diverts the injected carrier fluid into a flow direction corresponding to the substantially inward radial direction.

In a device in accordance with embodiments of the present invention, the at least one fluid inlet may form an opening in the circumferential wall.

In a device in accordance with embodiments of the present invention, the at least one fluid inlet may form an opening in the bottom wall or in the top wall.

In a device in accordance with embodiments of the present invention, the chamber may be adapted for, e.g. configured for, enabling an exchange, e.g. a homogeneous or heterogeneous exchange, of momentum, mass and/or energy between the carrier fluid and the target medium.

In a device in accordance with embodiments of the present invention, the distributor may be separated from the circumferential wall of the chamber by a gap having a width in the range of 1 mm to 15 mm, e.g. in the range of 1 mm to 10 mm, e.g. in the range of 1 mm to 5 mm, e.g. in the range of 2 mm to 5 mm, e.g. in the range of 2 mm to 10 mm, e.g. in the range of 3 mm to 6 mm. For example, the rotation of such distributor may be driven solely by shear forces without requiring any fins or fin-like structures on the distributor to drive the rotation. But in embodiments of the present invention, the distributor separated from the circumferential wall by such gap as described hereinabove may also comprise a short fin or short fins or fin-like structures, e.g. having a length in the range of 1 mm to 15 mm, e.g. in the range of 1 mm to 10 mm, e.g. in the range of 1 mm to 5 mm. Clearly, the length of the fin(s) or fin-like structures may be less, e.g. slightly less, that the width of the gap in such embodiments.

In a device in accordance with embodiments of the present invention, the distributor may be adapted for, e.g. configured for, rotating around the axis of symmetry due to a transfer of momentum from the carrier fluid to the distributor caused by shear stresses.

In a device in accordance with embodiments of the present invention, in operation of the device, a rotating bed of the target medium and the carrier fluid may be formed in the chamber. The target medium may comprise a solid phase or a fluid. For example, the rotating bed may fluidize the target medium comprising a solid phase in the carrier fluid.

In a device in accordance with embodiments of the present invention, the chamber may form a fluidized bed for fluidizing the target medium comprising a solid phase in the carrier fluid, e.g. in which the carrier fluid may comprise a liquid and/or a gas.

In a device in accordance with embodiments of the present invention, the chamber may be adapted, e.g. configured, for contacting the target medium comprising a fluid with the carrier fluid, e.g. in which the carrier fluid may comprise a liquid and/or a gas.

In a device in accordance with embodiments of the present invention, the device may be adapted for providing an azimuthal velocity between the injected carrier fluid and the circumferential wall that is larger than 5 m/s, e.g. in the range of 5 m/s to 500 m/s, e.g. in the range of 10 m/s to 300 m/s, e.g. in the range of 10 m/s to 100 m/s. For example, in a device in accordance with embodiments of the present invention, the distributor may be adapted for rotating at an angular velocity in the range of 100 to 200 rad/s, e.g. in the range of 200 to 1500 rad/s, e.g. in the range of 250 to 1000 rad/s.

A device in accordance with embodiments of the present invention may comprise an input feed for feeding the target medium into the chamber, e.g. before and/or during operation of the device. Alternatively, the chamber may be configured such that it can be opened before operation of the device to introduce the target medium onto the chamber.

A device in accordance with embodiments of the present invention may comprise at least one fin on the distributor, in which the at least one fin extends from the distributor in a substantially outward radial direction with respect to the axis of symmetry. The at least one fin may be adapted for, e.g. configured or arranged for, driving the rotation of the distributor around the axis of symmetry by a transfer of momentum between the injected carrier fluid and the at least one fin while diverting the injected carrier fluid into a flow direction corresponding to the substantially inward radial direction.

However, it is to be noted that tangential shear stresses acting on the distributor, e.g. on a perforated cylinder, may be sufficient to drive the rotation of the distributor, e.g. without necessarily requiring a fin as referred to hereinabove.

In a device in accordance with embodiments of the present invention, the at least one fin may be curved, having a free end portion distal from the distributor that is angularly shifted with respect to a fixed end portion (of the fin) proximal to the distributor, in which the angular shift is an angular shift around the axis of symmetry against the direction of flow in which the carrier fluid is injected into the chamber by the at least one fluid inlet in operation of the device. Such curved fin, e.g. a turbine-type blade, may advantageously enhance the transfer of momentum from the inlet fluid.

In a device in accordance with embodiments of the present invention, the distributor, e.g. the rotor part, may be integrally formed, e.g. optionally including the at least one fin.

In a device in accordance with embodiments of the present invention, the fluid distributor may be separated from the bottom and/or top walls of the chamber by a gap. This gap may be pressurized, e.g. to slightly exceed the pressure in the chamber, in operation of the device. This may advantageously prevent an increase in friction due to material, e.g. fine particles, entering the gap.

In a device in accordance with embodiments of the present invention, the at least one fin may comprise at least three fins uniformly distributed around the circumference of the distributor.

In a device in accordance with embodiments of the present invention, the distributor may comprise a cylinder having perforations provided therein such as to allow the injected carrier fluid to pass through the distributor in the substantially inward radial direction. For example, the outer circumferential surface of the distributor, e.g. the perforated cylinder, may have an open area in the range of 40% to 99%, e.g. in the range of 50% to 90%. The cylinder may form a toroidal solid bed, a liquid layer or a liquid-solid layer holder in operation of the device.

In a device in accordance with embodiments of the present invention, at least a part of the bottom wall may be formed by a bottom plate that is arranged centrally around the axis of symmetry in a plane perpendicular to the axis of symmetry and that is mechanically decoupled from the distributor such as to remain mechanically static when the distributor rotates around the axis of symmetry.

In a device in accordance with embodiments of the present invention, the bottom plate may be rotationally symmetric with respect to the axis of symmetry. The bottom plate may be tapered such as to extend toward the top wall in a central region of the bottom plate and to extend away from the top wall in a peripheral region of the bottom plate.

In a device in accordance with embodiments of the present invention, the distributor may be mechanically supported such as to enable the distributor to rotate around the axis of symmetry, e.g. to freely rotate such as to enable it to be driven by the injected carrier fluid.

A device in accordance with embodiments of the present invention may comprise a rotatable shaft for rotating around the axis of symmetry, in which the rotatable shaft is mechanically linked to the distributor to mechanically support the distributor and to enable the rotation of the distributor.

In a device in accordance with embodiments of the present invention, the rotatable shaft may comprise an external bearing at its outer surface to engage a cuff formed in a housing of the chamber.

In a device in accordance with embodiments of the present invention, the distributor may comprises a linkage structure for mechanically linking the rotatable shaft to the distributor, e.g. to the cylinder that has perforations provided therein to allow the injected carrier fluid to pass through the distributor in the substantially inward radial direction.

In a device in accordance with embodiments of the present invention, the rotatable shaft may be a hollow shaft, in which the rotatable shaft may comprise an internal bearing at its inner surface to engage a spindle that is coaxially provided inside the rotatable shaft. This spindle may be mechanically linked to the bottom plate.

In a device in accordance with embodiments of the present invention, the linkage structure may comprise a plate that is oriented perpendicular to the shaft. This plate may be grooved such as to form a labyrinth fluid seal in conjunction with the bottom plate.

The device in accordance with embodiments of the present invention comprises an outlet for letting the carrier fluid flow out of the chamber. For example, a device in accordance with embodiments of the present invention may comprise an exhaust, e.g. a chimney structure, for collecting the carrier fluid from the chamber, e.g. through an opening in the chamber, e.g. the outlet may be or comprise an exhaust, e.g. a chimney structure. The exhaust, e.g. the chimney structure, may be adapted for collecting the carrier fluid from the chamber through an opening in the top wall, e.g. in a central region of the top wall. The exhaust, e.g. the chimney structure, may be adapted for collecting the carrier fluid from the chamber through an opening in the bottom wall, e.g. in a central region of the bottom wall. The exhaust, e.g. the chimney structure or chimney structures, may be adapted for collecting the carrier fluid from the chamber through an opening in the both top and bottom walls, e.g. in a central region of the top and bottom walls.

In a device in accordance with embodiments of the present invention, the at least one fluid inlet may comprise a nozzle ending in the opening in the circumferential wall, in which this nozzle has a first wall section that connects continuously and tangentially to the inner surface of the circumferential wall and a second wall section that connects to the inner surface at an acute angle such as to focus a flow of the injected carrier fluid azimuthally along the inner surface.

In a second aspect, the present invention also relates to a method for bringing a target medium into contact with a carrier fluid in a process that requires intensive interfacial momentum, mass and/or energy exchange between the carrier fluid and the target medium, the method comprising:

feeding the target medium into a chamber, for containing the target medium while contacting the carrier fluid, in which this chamber is substantially rotationally symmetric with respect to an axis of symmetry and adapted for remaining mechanically static while performing the method;

injecting the carrier fluid under pressure into the chamber, e.g. via at least one opening in a circumferential wall of the chamber, in which this injecting is in a substantially tangential direction with respect to an inner surface of the circumferential wall;

letting said carrier fluid flow out of said chamber, e.g. collecting the carrier fluid from the chamber via an outlet, and driving a rotation of a fluid distributor in the chamber by the injected carrier fluid, due to a transfer of momentum between the injected carrier fluid and the distributor, in which the injected carrier fluid is diverted in a flow direction corresponding to a substantially inward radial direction with respect to the axis of symmetry and passes through the distributor toward the axis of symmetry.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
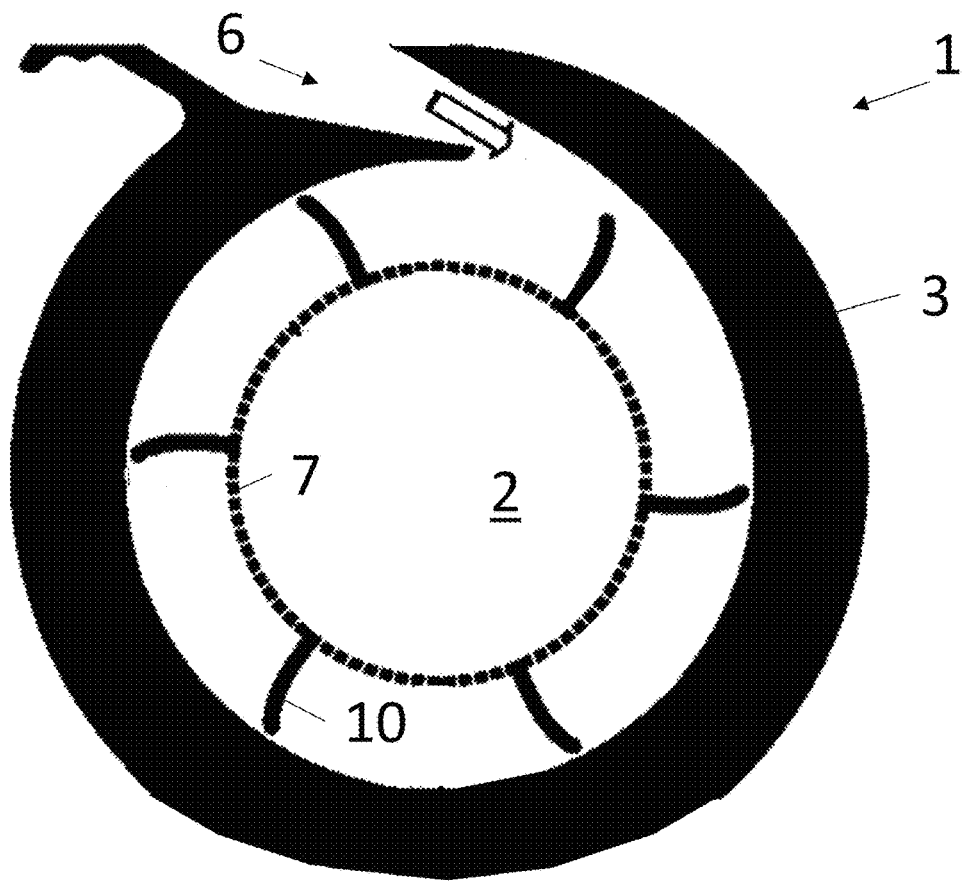
FIG. 1 shows a schematic top view of an exemplary device in accordance with embodiments of the present invention.
Figure 2:
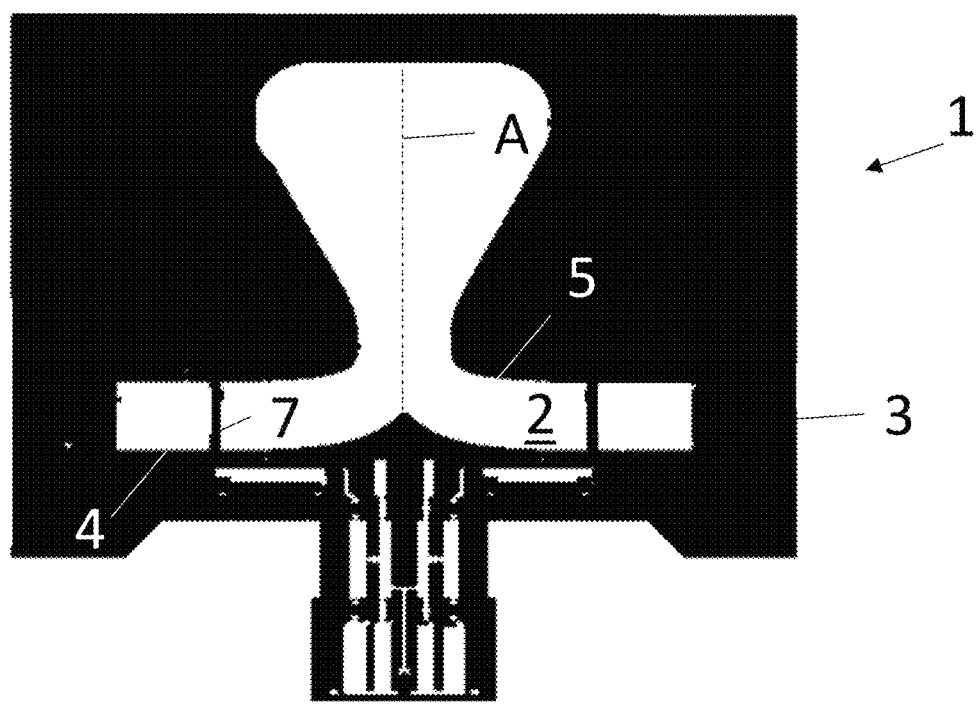
FIG. 2 shows a schematic side view of an exemplary device in accordance with embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "under pressure", reference is made to the application of a pressure gradient in operation of a device or application of a method, such as to forcefully inject a fluid from a source, e.g. a fluid inlet, to a target, e.g. a chamber. Thus, reference to a fluid inlet for injecting a carrier fluid under pressure into a chamber may mean a fluid inlet suitable for bringing the carrier fluid into the chamber when a substantially higher pressure is applied to the fluid in the fluid inlet, e.g. near a fluid receiving end of the fluid inlet, than is established in the chamber, e.g. near a fluid exit of the fluid inlet.

Where in embodiments of the present invention reference is made to "substantially rotationally symmetric," or even to "rotationally symmetric," this may refer to a rotational symmetry insofar any asymmetry due to a fluid inlet in the circumferential wall is disregarded and/or insofar trivial deviations from rotational symmetry are ignored that do not significantly affect the function and/or operation of the device. Thus a device lacking a literal rotational symmetry should not be considered as falling outside the intended scope if the deviation of rotational symmetry is merely trivial.

Where in embodiments of the present invention reference is made to tangential, azimuthal, radial and/or axial, these may be interpreted in terms of a cylindrical coordinate system or cylindrical directional reference system in which the axial orientation is identified with the axis of symmetry of the chamber, as referred to hereinbelow, in a device in accordance with embodiments of the present invention.

In a first aspect, the present invention relates to a device for bringing a target medium into contact with a carrier fluid. The device comprises a chamber that comprises a circumferential wall, a bottom wall and a top wall, configured such that the chamber forms an enclosure for containing the target medium while contacting the carrier fluid in operation of the device. The chamber is substantially rotationally symmetric with respect to an axis of symmetry. The chamber is adapted for remaining mechanically static in operation of the device. The device comprises at least one fluid inlet for injecting the carrier fluid under pressure into the chamber. The at least one fluid inlet is adapted for injecting the carrier fluid into the chamber in a substantially tangential direction with respect to an inner surface of the circumferential wall. The device also comprises a fluid distributor arranged in the chamber, in which the fluid distributor is adapted for enabling the injected carrier fluid to pass through the distributor in a substantially inward radial direction with respect to the axis of symmetry. The distributor is substantially rotationally symmetric with respect to the axis of symmetry. The distributor is furthermore adapted for rotating around the axis of symmetry. This rotation is driven, in operation of the device, by a transfer of momentum between the injected carrier fluid and the distributor.

Referring to FIG. 1 to FIG. 9, an exemplary device 1 in accordance with embodiments of the present invention is shown. This device 1 is suitable for bringing a target medium into contact with a carrier fluid.

Advantageously, the device may be operated, e.g. may be suitable for operation, maximum azimuthal velocities of 10 m/s and higher, e.g. in the range of 10 m/s and 100 m/s, and possibly even higher, may be achieved for a relatively low carrier fluid mass rate in the range of 8 g/s to 30 g/s.

The device 1 comprises a chamber 2 that comprises a circumferential wall 3, a bottom wall 4 and a top wall 5, configured such that the chamber 2 forms an enclosure for containing the target medium while contacting the carrier fluid in operation of the device.

The chamber 2 is substantially rotationally symmetric with respect to an axis of symmetry A. For example, the chamber 2 may be generally circular and/or cylindrical in shape.

The chamber 2 is adapted for remaining mechanically static in operation of the device. The chamber may be referred to as a stator or stator part. The chamber may form part of, or may be statically mechanically linked to, a housing for being stably supported, e.g. on the ground, e.g. to remain in rest with respect to a reference frame tied to a fixed point and fixed orientation with respect to the Earth's surface, in operation of the device.

The chamber 2 may be, particularly, unsuitable for rotating with respect to an external static frame of reference in normal operation of the device.

The device comprises at least one fluid inlet 6 for injecting the carrier fluid under pressure into the chamber, e.g. under a pressure difference, e.g. for injecting the carrier fluid when a pressure difference is applied between the chamber and the at least one fluid inlet in operation of the device.

The at least one fluid inlet 6 may form an opening in the circumferential wall 3 of the chamber 2. However, embodiments of the present invention are not necessarily limited thereto, e.g. the at least one fluid inlet 6 may form an opening the bottom wall 4, in the top wall 5, or any combination of the circumferential wall 3, the bottom wall 4 and/or the top wall 5.

The at least one fluid inlet 6 is adapted for injecting the carrier fluid into the chamber in a substantially tangential direction with respect to an inner surface of the circumferential wall 3.

The device also comprises a fluid distributor 7 arranged in the chamber 2, in which the fluid distributor 7 is adapted for enabling the injected carrier fluid to pass through the distributor in a substantially inward radial direction with respect to the axis of symmetry A. The fluid distributor 7 is substantially rotationally symmetric with respect to the axis of symmetry A.

The fluid distributor 7 is furthermore adapted for rotating around the axis of symmetry A. This rotation is driven by a transfer of momentum between the injected carrier fluid and the distributor in operation of the device, e.g. while the distributor diverts the injected carrier fluid into a flow direction corresponding to the substantially inward radial direction.

In a device in accordance with embodiments of the present invention, the fluid distributor 7 may be adapted for, e.g. configured for, rotating around the axis of symmetry due to a transfer of momentum from the carrier fluid to the distributor caused by shear stresses.

In a device in accordance with embodiments of the present invention, the chamber may form a fluidized bed for fluidizing the target medium comprising a solid phase in the carrier fluid, e.g. in which the carrier fluid may comprise a liquid and/or a gas. For example, in operation of the device, a fluidized bed may be supported by the rotating fluid distributor 7.

In a device in accordance with embodiments of the present invention, the chamber may be adapted, e.g. configured, for contacting the target medium comprising a liquid with the carrier fluid, e.g. in which the carrier fluid may comprise a fluid and/or a gas. For example, in operation of the device, a liquid layer or solid-liquid layer may be supported by the rotating fluid distributor 7.

For example, the target medium may comprise a first liquid, and the carrier fluid may comprise a second liquid, in which the first liquid and the second liquid are mutually immiscible.

In a device in accordance with embodiments of the present invention, the fluid distributor 7 may be adapted for rotating at an angular velocity in the range of 100 to 200 rad/s, e.g. in the range of 200 to 1500 rad/s, e.g. in the range of 250 to 1000 rad/s.

Figure 3:
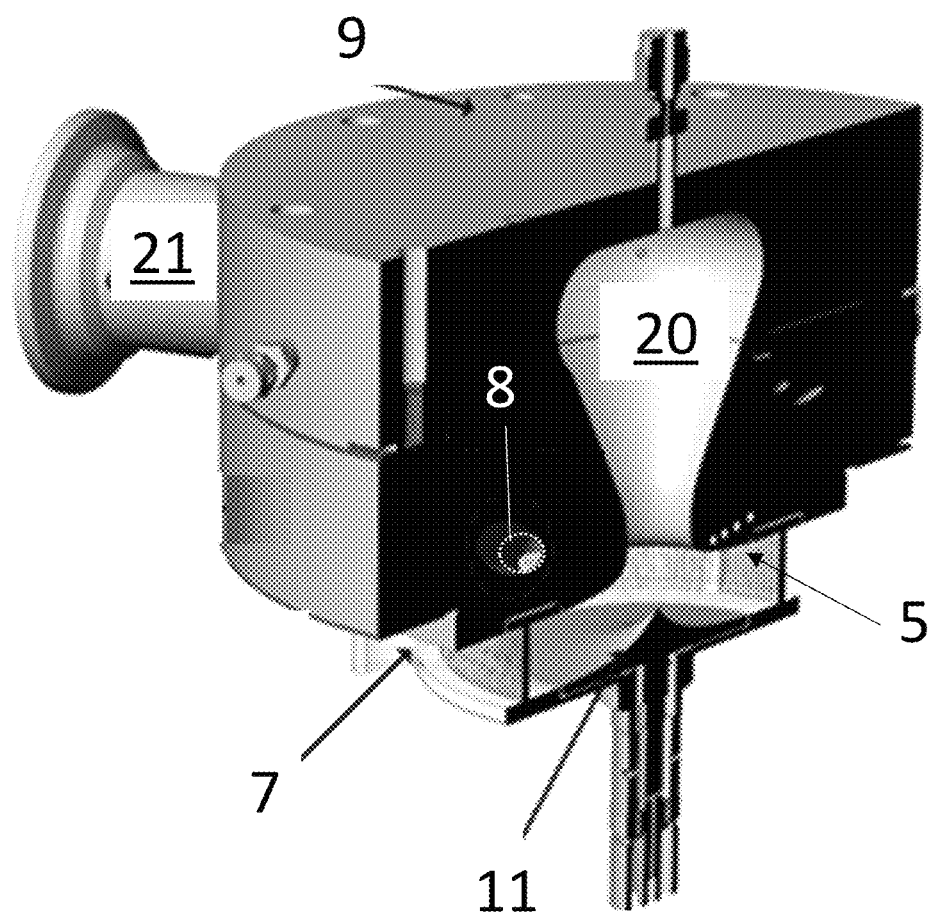
FIG. 3 shows a three-dimensional schematic view of an exemplary device in accordance with embodiments of the present invention.

Referring to FIG. 3, a device in accordance with embodiments of the present invention may comprise an input feed 8 for feeding the target medium into the chamber 2, e.g. before and/or during operation of the device. Alternatively, the chamber may be configured such that it can be opened before operation of the device to introduce the target medium onto the chamber. For example, a top lid 9 may be (reversibly) removable to provide access to the chamber 2 before operation of the device.

A device in accordance with embodiments of the present invention, may comprise at least one fin 10 on the distributor 7, in which the at least one fin extends from the distributor 7 in a substantially outward radial direction with respect to the axis of symmetry. The at least one fin 10 may be adapted for driving the rotation of the distributor 7 around the axis of symmetry A by a transfer of momentum between the injected carrier fluid and the at least one fin 10, while also, e.g. simultaneously, diverting the injected carrier fluid into a flow direction corresponding to the substantially inward radial direction.

In a device in accordance with embodiments of the present invention, the at least one fin 10 may be curved, having a free end portion distal from the distributor 7 that is angularly shifted with respect to a fixed end portion (of the fin) proximal to the distributor 7, in which the angular shift is an angular shift around the axis of symmetry against the direction of flow in which the carrier fluid is injected into the chamber 2 by the at least one fluid inlet in operation of the device.

For example, the free end portion of the fin 10 may be separated from the circumferential wall 3 of the chamber 2 by a distance of less than 10 mm, e.g. less than 5 mm, e.g. in the range of 0 mm to 3 mm, e.g. 1 mm.

In a device in accordance with embodiments of the present invention, the at least one fin 10 may comprise at least three fins uniformly distributed around the circumference of the distributor 7.

Figure 7:
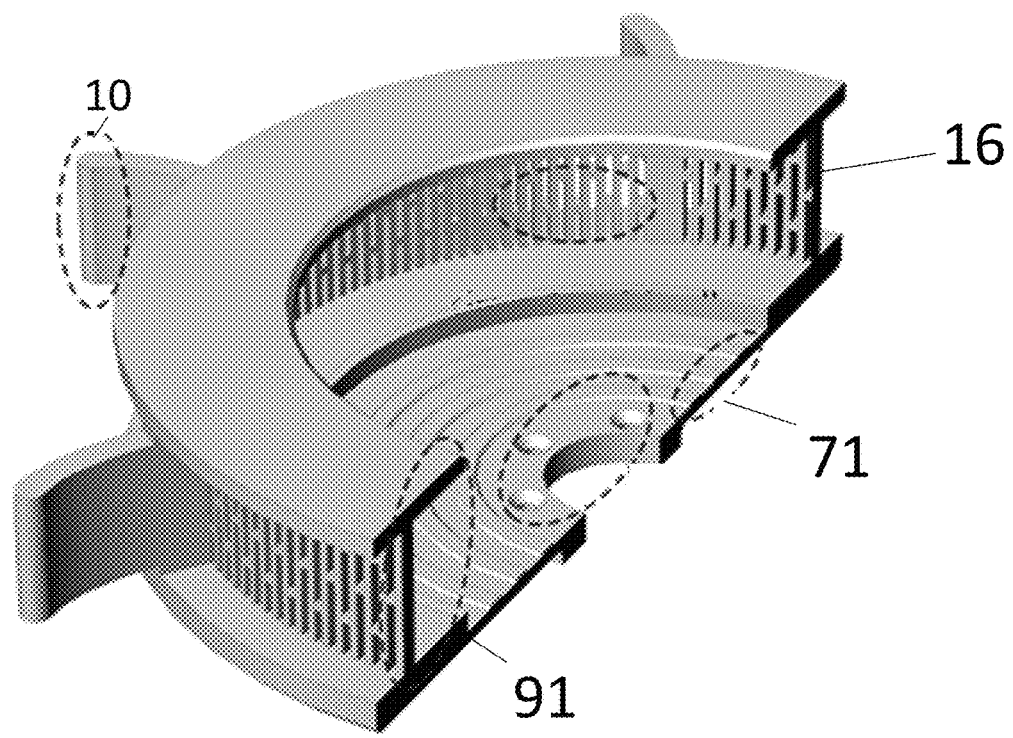
FIG. 7 schematically illustrates a rotor part of a device in accordance with embodiments of the present invention.

Referring to FIG. 7, in a device in accordance with embodiments of the present invention, the distributor 7 may comprise a cylinder 16 having perforations provided therein such as to allow the injected carrier fluid to pass through the fluid distributor 7 in the substantially inward radial direction. For example, the perforations may comprise slits. For example, the slits may be arranged to form H-shaped patterns of slits, e.g. to offset the slits in a manner similar to a broken bond masonry structure. This may advantageously provide a good open area while still providing a good structural integrity to the cylinder, e.g. particularly to ensure integrity when rotating at high velocities.

Figure 9:
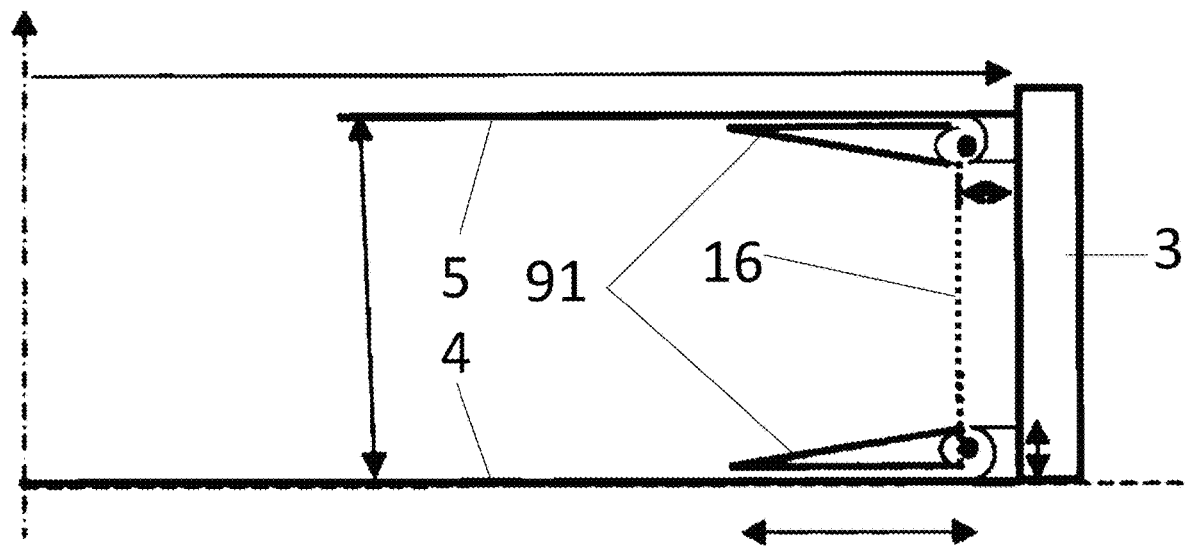
FIG. 9 schematically illustrates a distributor of a device in accordance with embodiments of the present invention.

Referring to FIG. 9, the distributor 7 may furthermore comprise end profiles 91, which are provided at a top and bottom end of the cylinder and extend radially inward. Optionally, these profiles may be tapered, e.g. such as to increase in thickness in a direction radially toward the cylinder 16 and/or such that a distance between both end profiles 91, measured in the axial direction, decreases toward the cylinder 16. The cylinder and top and bottom end profiles may advantageously form a compact support for holding a fluidized bed, liquid layer or liquid-solid layer in operation of the device, e.g. reducing possible friction losses by the difference in velocity between the static chamber and the target medium co-rotating with the cylinder.

Figure 5:
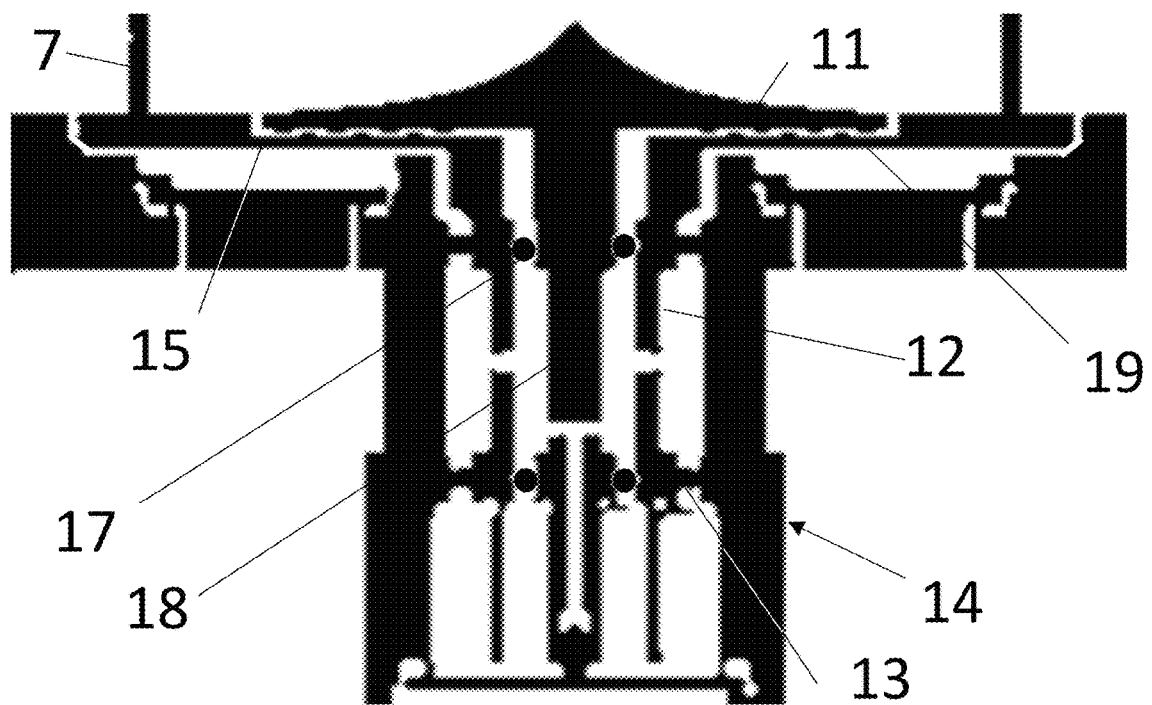
FIG. 5 shows a cross section of a chamber, a distributor and a shaft in an exemplary device in accordance with embodiments of the present invention.

In another aspect, the present invention may also relate to a rotor part for use in a device in accordance with embodiments of the first aspect of the present invention. This rotor part may comprise the fluid distributor 7, e.g. the cylinder 16, e.g. the perforated cylinder. The rotor part may also comprise the linkage structure 15 for mechanically linking the rotatable shaft 12 to the fluid distributor 7, e.g. to the cylinder 16. The linkage structure 15 may comprise the plate 19. This plate may be grooved such as to form a labyrinth fluid seal 71 in conjunction with a bottom plate, e.g. as shown in FIG. 5. The rotor part may also comprise the at least one fin 10.

The rotor part may be composed of a polymer material, e.g. a transparent polymer.

As an example, embodiments not being intended as limited thereto, this material may have a density in the range of 1180 to 1200 kg/m$^3$, and/or a tensile strength in the range of 49 to 50 MPa. For example, the rotor part may have a mass in the range of 1 g to 250 g, preferably, in the range of 5 g to 100 g, e.g. in the range of 25 g to 50 g, e.g. 38 g. Perforations may be provided in the cylinder such as to obtain an open circumferential area fraction at the inner edge of, for example, 58%. The cylinder may have an inner diameter in the range of, for example, 40 mm to 160 mm, e.g. 60 mm to 100 mm, e.g. 70 mm to 90 mm, e.g. 80 mm. The cylinder may have a thickness in the range of 0.5 mm to 10 mm, e.g. in the range of 1 mm to 5 mm, e.g. 2 mm. The fins 10 may have a thickness in the range of 1 mm to 10 mm, e.g. in the range of 2 mm to 5 mm, e.g. 3 mm.

For example, embodiments of the present invention not being limited thereto, a rotor part may be 3D printed using stereolithography as a single piece (e.g. a replaceable piece).

The perforated cylinder 16 may have an open area in the range of 40% to 99%, e.g. in the range of 50% to 90%. For example, 'open area' may refer to the ratio of the total area of the perforations over the total area of the cylinder when the perforations were to be considered absent.

The term 'perforations' does not necessarily refer to openings obtained by the act of perforating, but may equally refer to similar openings obtained by another method. For example, a perforation may equally be integrally formed in the cylinder when constructing the cylinder, e.g. by using a 3D printing technique to integrally form the cylinder, or to integrally form the distributor 7, e.g. to integrally form the rotor part comprising the distributor and, optionally, at least one fin on the distributor.

The cylinder may form a toroidal solid bed, a liquid layer or a liquid-solid layer holder in operation of the device.

Figure 4:
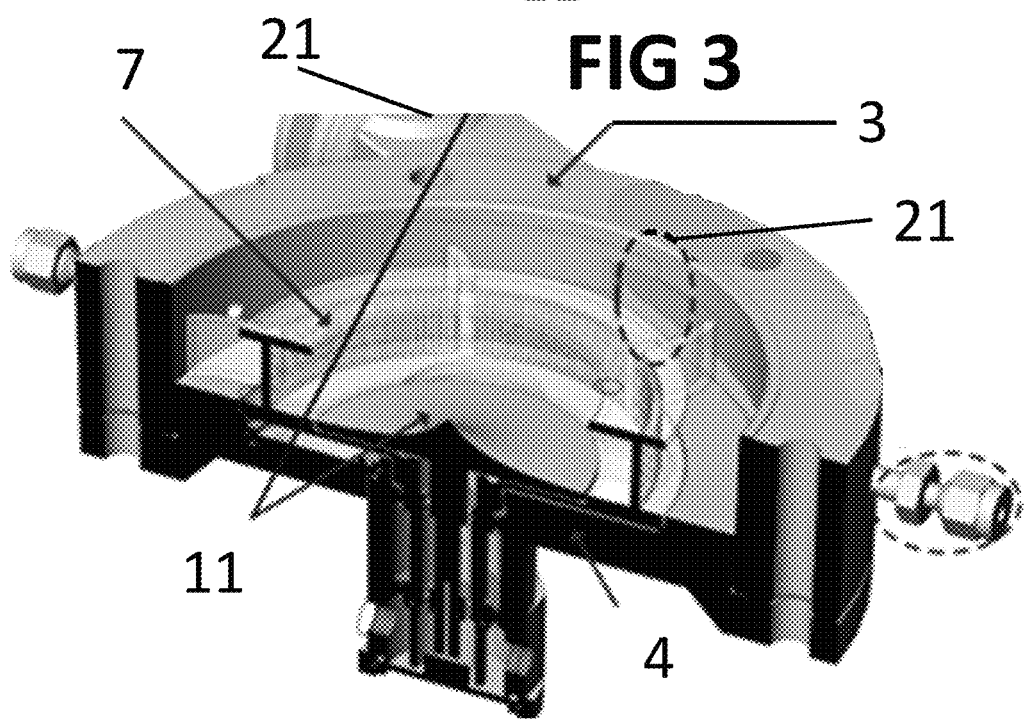
FIG. 4 shows a three-dimensional detail view of a chamber and a distributor in an exemplary device in accordance with embodiments of the present invention.

Referring to FIG. 4, in a device in accordance with embodiments of the present invention, at least a part of the bottom wall 4 may be formed by a bottom plate 11 that is arranged centrally around the axis of symmetry A in a plane perpendicular to the axis of symmetry A and that is mechanically decoupled from the distributor 7 such as to remain mechanically static when the distributor 7 rotates around the axis of symmetry A.

In a device in accordance with embodiments of the present invention, the bottom plate 11 may be rotationally symmetric with respect to the axis of symmetry A. The bottom plate may be tapered such as to extend toward the top wall 5 in a central region of the bottom plate and to extend away from the top wall in a peripheral region of the bottom plate. In other words, the bottom plate may be tapered such as to be closer to the top wall 5 in a central region of the bottom plate than in a peripheral region of the bottom plate.

In a device in accordance with embodiments of the present invention, the fluid distributor 7 may be mechanically supported such as to enable the distributor 7 to rotate around the axis of symmetry, e.g. to freely rotate such as to enable it to be driven by the injected carrier fluid.

Figure 6:
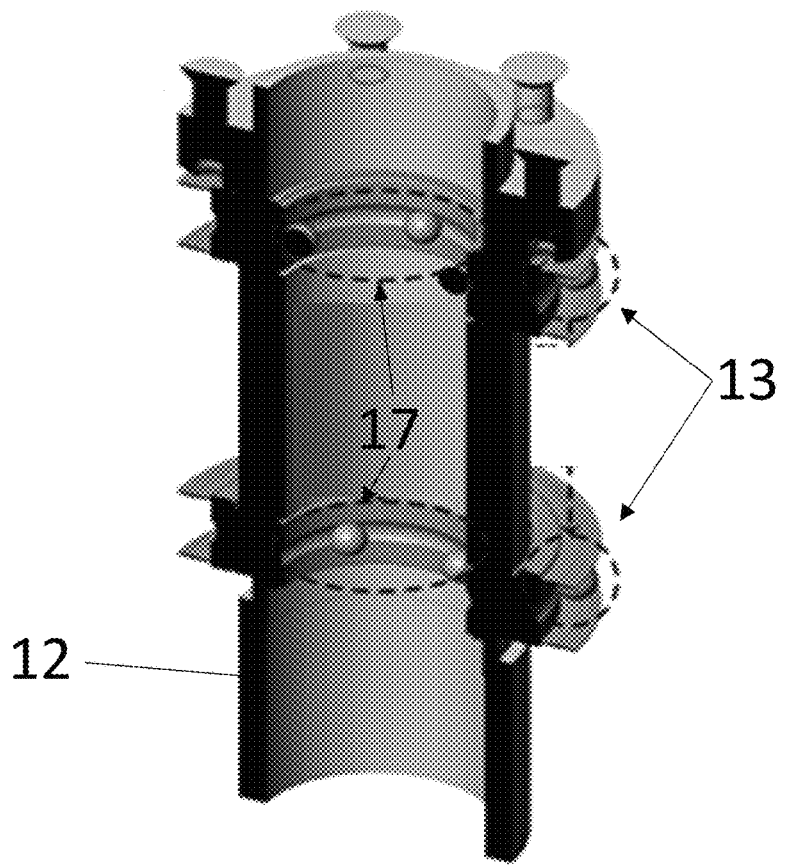
FIG. 6 shows a cross section of a shaft in an exemplary device in accordance with embodiments of the present invention.

Referring to FIG. 5 and FIG. 6, a device in accordance with embodiments of the present invention may comprise a rotatable shaft 12 for rotating around the axis of symmetry A, in which the rotatable shaft is mechanically linked to the fluid distributor 7 to mechanically support the distributor 7 and to enable the rotation of the distributor 7. For example, the rotatable shaft may be a metal shaft, e.g. a stainless steel shaft, such as composed of SS316 stainless steel.

In a device in accordance with embodiments of the present invention, the rotatable shaft 12 may comprise an external bearing 13, e.g. ball bearings, e.g. at least one low-friction bearing, at its outer surface to engage a housing of the chamber, e.g. to engage a cuff 14 formed in a housing of the chamber.

In a device in accordance with embodiments of the present invention, the distributor may comprises a linkage structure 15 for mechanically linking the rotatable shaft 12 to the fluid distributor 7, e.g. to the cylinder 16 having perforations provided therein to allow the injected carrier fluid to pass through the distributor in the substantially inward radial direction.

In a device in accordance with embodiments of the present invention, the rotatable shaft 12 may be a hollow shaft, e.g. a hollow metal shaft, in which the rotatable shaft may comprise an internal bearing 17, e.g. ball bearings, e.g. at least one low-friction bearing, at its inner surface to engage a spindle 18 that is coaxially provided inside the rotatable shaft. This spindle 18 may be mechanically linked to the bottom plate 11.

The shaft may be composed of a material having a density in the range of 5000 to 15000 kg/m$^3$, e.g. about 8000 kg/m$^3$, and a tensile strength in the range of 300 to 900 MPa, e.g. about 515 MPa, embodiments of the present invention not being limited by such exemplary values.

The shaft may have a low mass, e.g. in the range of 0 g to 500 g, e.g. preferably in the range of 25 g to 250 g, e.g. in the range of 40 g to 100 g, e.g. about 60 g.

In a device in accordance with embodiments of the present invention, the linkage structure 15 may comprise a plate 19 that is oriented perpendicular to the shaft. This plate may be grooved such as to form a labyrinth fluid seal in conjunction with the bottom plate, e.g. as shown in FIG. 5.

Referring to, for example, FIG. 3, a device in accordance with embodiments of the present invention may comprise an exhaust 20, e.g. a chimney structure, for collecting the carrier fluid from the chamber through an opening in the top wall, e.g. in a central region of the top wall. For example, a gas outlet 21 may be connect to the exhaust 20.

Referring back to FIG. 1, in a device in accordance with embodiments of the present invention, the at least one fluid inlet 6 may comprise a nozzle ending in the opening in the circumferential wall, in which this nozzle has a first wall section that connects continuously and tangentially to the inner surface of the circumferential wall and a second wall section that connects to the inner surface at an acute angle such as to focus a flow of the injected carrier fluid azimuthally along the inner surface.

In a second aspect, the present invention also relates to a method for bringing a target medium into contact with a carrier fluid. The method comprises feeding the target medium into a chamber for containing the target medium while contacting the carrier fluid, e.g. the target medium being contained while contacting the carrier fluid. The chamber is substantially rotationally symmetric with respect to an axis of symmetry and adapted for remaining mechanically static while performing the method.

The method comprises a step of injecting the carrier fluid under pressure into the chamber, e.g. via at least one opening in a circumferential wall of the chamber, in which this injecting is in a substantially tangential direction with respect to an inner surface of the circumferential wall.

The method comprises driving a rotation of a fluid distributor in the chamber by the injected carrier fluid, due to a transfer of momentum between the injected carrier fluid and the distributor, in which the injected carrier fluid is diverted in a flow direction corresponding to a substantially inward radial direction with respect to the axis of symmetry and passes through the distributor toward the axis of symmetry.

Further features of a method in accordance with embodiments of the present invention shall be clear from the description provided hereinabove relating to embodiments of the first aspect of the present invention. Particularly, a method in accordance with embodiments of the present invention may comprise operating a device in accordance with embodiments of the first aspect of the present invention, e.g. performing a step to obtain a function of a feature of a device as described hereinabove.

Figure 10:
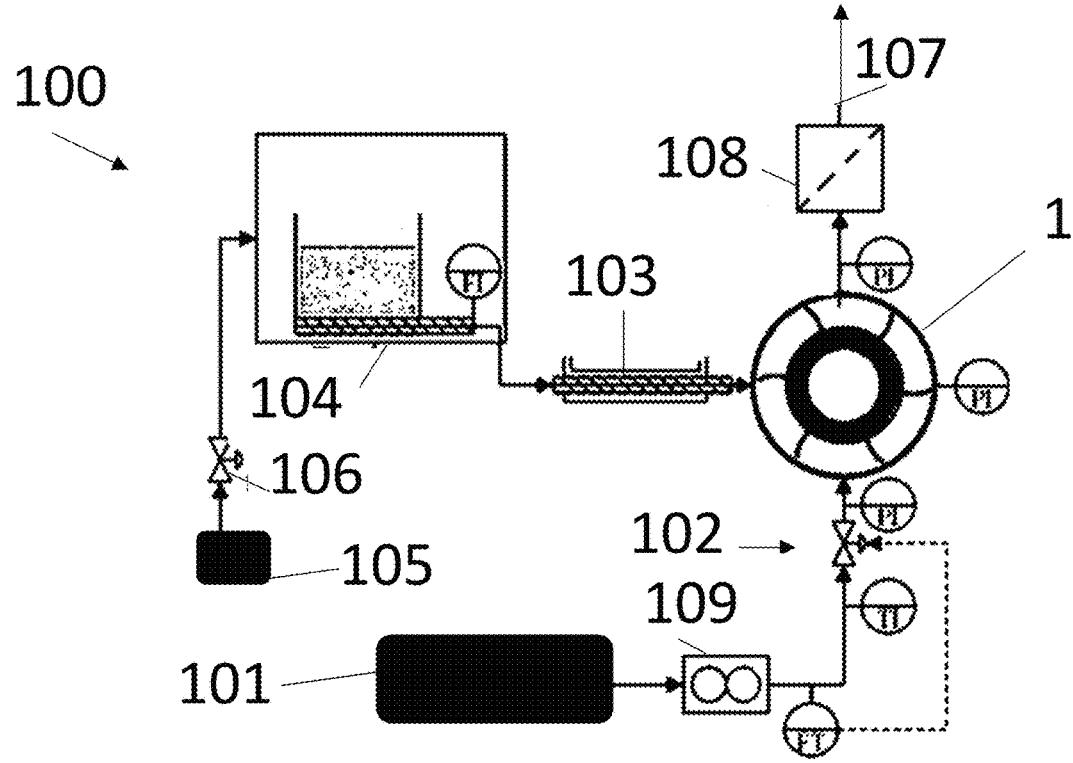
FIG. 10 illustrates a system in accordance with embodiments of the present invention.

In a third aspect, the present invention also relates to a system comprising a device in accordance with embodiments of the first aspect of the present invention. For example, FIG. 10 illustrates such as exemplary system 100. A system in accordance with embodiments of the present invention may comprise a supply line for the carrier fluid, e.g. a pressurized air supply 101 connected to a pressure regulator 102. The carrier fluid may be provided, under controlled pressure, to the device 1 in accordance with embodiments of the present invention. For example, compressed air at 200-300 kPa, in present example, may flow through a flow meter and a control valve before entering the chamber.

The system may comprise a feeder mechanism for providing, for example, a solid to the device 1. For example, such feeder mechanism may comprise an injector screw 103 for controllably extracting the target medium from a feeder enclosure 104, e.g. a pressure-controlled gravimetric feeder, e.g. connected to a pressurized air supply 105 with pressure regulator 106. For example, a gravimetric feeder may deliver solid particles to a 10 mm diameter injector screw which conveys the solids into the chamber. A leak-tight metallic enclosure, connected to pressurized air, may surround the gravimetric feeder. Such leak-tight metallic enclosure may allow to regulate the pressure on top of the gravimetric feeder, e.g. up to a maximum value of 300 kPa in this example.

An exhaust of the device 1, e.g. the outlet or chimney structure of the device 1, may be connected to an outlet of the system, e.g. an air outlet 107. A bag filter 108 may be provided in between the exhaust of the device 1 and the outlet 107 to separate solid particles from the exhaust air.

The system may further comprise control and measurement means, as known in the art, such as flow meters 109, temperature indicators TI, pressure indicators PI, flow indicators FI and flow transmitters FT.

Figure 8:
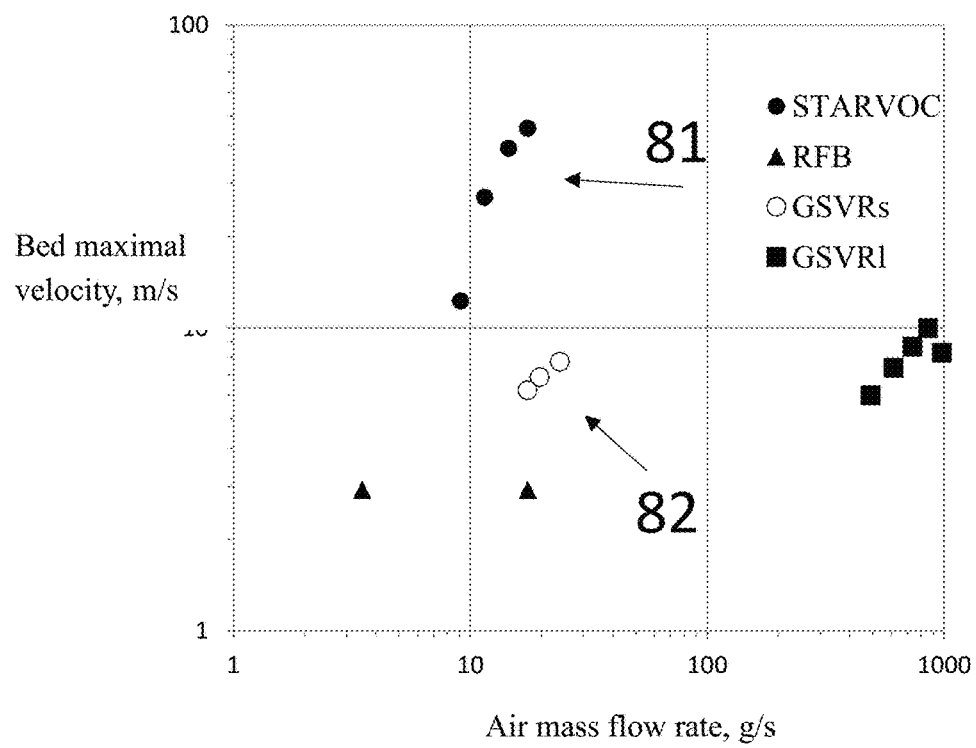
FIG. 8 shows, as an example, a comparison of the azimuthal velocity of a fluidized bed that can be achieved by a device and method in accordance with embodiments of the present invention, and that of a prior-art centrifugal gas-solid fluidization technology.

In an example illustrating embodiments of the present invention, FIG. 8 shows a comparison of the azimuthal velocity of a fluidized bed that can be achieved by a device and method in accordance with embodiments of the present invention, represented by the ellipse filled markers 81, with a prior-art centrifugal gas-solid fluidization technology, represented by the ellipse hollow markers 82. The square markers correspond to results from "Solids velocity fields in a cold-flow gas-solid vortex reactor" by Kovacevic et al., Chem. Eng. Sci. 123, pp. 220-230, and the triangle markers represent other results obtained by the authors. All markers are representative of the outer edge.

The prior art reference in this example corresponds to a gas-solid vortex reactor, as known in the art, for example as disclosed in "Gas-solid fluidized beds in vortex chambers" by De Wilde, Chem. Eng. Process. Process Intensif. 85, pp. 256-290.

The prior art reference method may reach solid bed azimuthal velocities of less than 10 m/s while requiring a relatively high air mass flow rate as indicated by the ellipse hollow markers 82. The approach in accordance with embodiments of the present invention can perform as indicated by the ellipse filled markers 81. For example, the maximum centrifugal acceleration experienced by the bed with the prior art centrifugal technology was, for example, 150 times the gravitational acceleration. In contrast, the approach in accordance with embodiments of the present invention surprisingly showed maximum centrifugal acceleration equivalent to 5000 times the earth gravity. Furthermore, a reduction of about 50% in gas mass flow rate can be sufficient, in present example, to reach comparable centrifugal accelerations. Furthermore, no external energy consumption aside from the kinetic energy of the incoming air would be advantageously required. Conversely, a reduction of about 50% in pressure drop to reach comparable centrifugal accelerations could be observed.

As an example of a device in accordance with the present invention, a system as illustrated in FIG. 10 was implemented. A gravimetric feeder, model KMLSFSKT20, available from COPERION K-TRON, was used for delivering solid particles to a 10 mm diameter injector auger which conveys the solids to the chamber of the device. The leak-tight enclosure of the gravimetric feeder was connected to a pressurized air supply, up to a maximum of 300 kPa. Compressed air at 200 to 300 kPa flows through a flow meter, model EL-FLOW®, available from BRONKHORST, and a control valve, model RESEARCH CONTROL®, available from BADGER METER, before entering the chamber. A bag filter, model 6943, available from FILTEX, separates solid particles from the exhaust air at the outlet of the device.

In this example, the device comprises a rotatable perforated cylinder, e.g. as illustrated in FIG. 7. The cylinder has a nominal diameter of 80 mm. The chamber has a nominal height of 15 mm.

Twelve differential and three absolute pressure sensors (UNIK 5000) were used during this exemplary experiment. The differential pressure sensors have a span of −20 to 20 kPa, two absolute pressure sensors have a span of 80 to 120 kPa, while the remaining absolute pressure sensor has a span of 80 to 160 kPa. All pressure sensors have a frequency response of 3.5 kHz and a full scale accuracy of ±0.04%. A data acquisition board (DAP 840, available from MICROSTAR LABORATORIES) with a frequency of 10 Hz was used.

Figure 11:
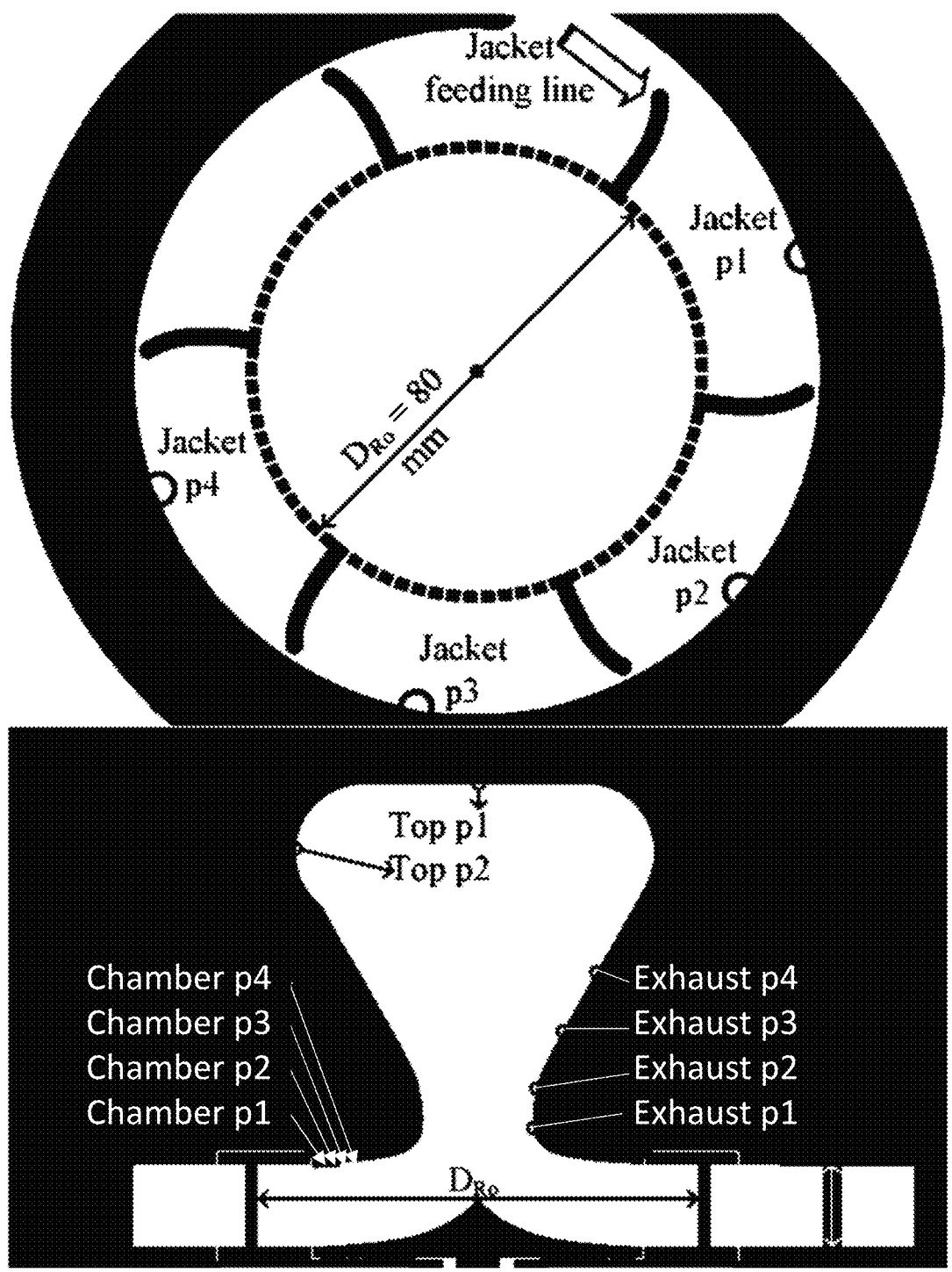
FIG. 11 shows locations of pressure measurement sites in an example for illustrating embodiments of the present invention.

The locations of the taps for pressure measurement are shown in FIG. 11. The absolute pressure sensor with the largest span was connected to the tap at the jacket outer wall at 70° clockwise direction starting from the 12 o'clock position. That absolute sensor is identified as "Jacket p1" in FIG. 11. Three differential pressure sensors identified as Jacket p2, p3 and p4 were connected to taps at the jacket outer wall at azimuthal angles of 130°, 190° and 250° clockwise direction starting from the 12 o'clock position. Four differential pressure sensors were connected to taps located inside the chamber at a constant azimuthal angle and at radial positions between 20 and 30 mm. Those differential pressure sensors are identified as Chamber p1, p2, p3 and p4 in FIG. 11. Besides, four differential pressure sensors, Exhaust p1, p2, p3 and p4 were connected to taps at the wall of the diverging exhaust. Finally, differential pressure was also measured at the circumferential wall of the top lid and the location identified as Top p2 in FIG. 11. Absolute pressure was measured at Top p1 located at the center of the top lid and at the gas outlet line. The location of the latter tap is not shown in FIG. 11. All differential pressure sensors had the absolute sensor located at Jacket p1 as their reference. All pressure sensors were recalibrated on a daily basis during this exemplary experiment.

Figure 12:
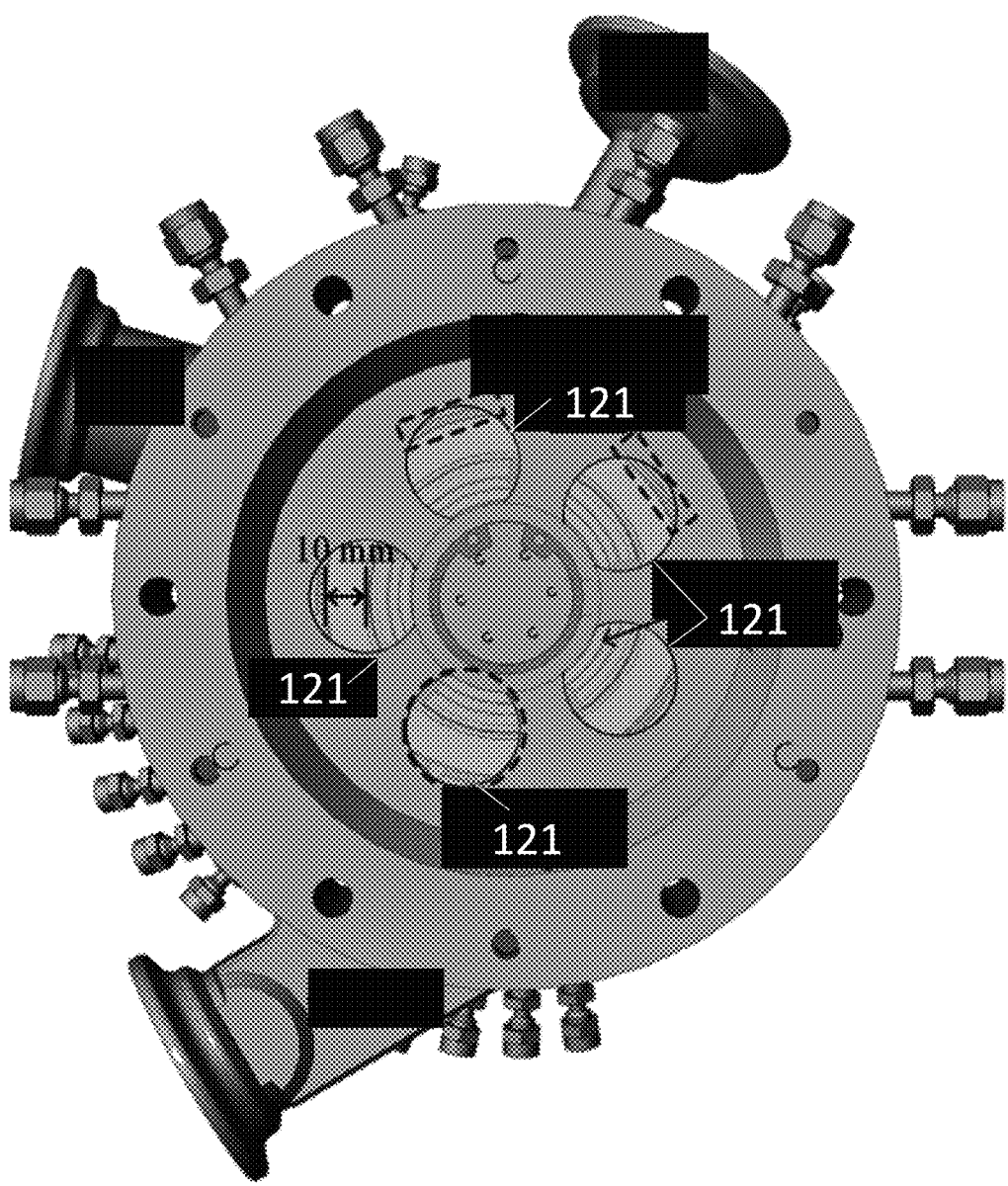
FIG. 12 shows a view from a digital camera placed underneath a device in accordance with embodiments of the present invention, in an example for illustrating embodiments of the present invention.

Experiments were recorded with a digital camera (GO-PRO 3+) placed underneath the device in accordance with embodiments of the present invention. An illustration of the view from the digital camera is shown in FIG. 12. Five circular viewports 121 made of transparent polycarbonate glass are evenly distributed beneath the bottom lid. Radial positions between 30 mm and 43 mm are thus visually accessible. Consequently bed heights of up to 10 mm along with the rotor outer circumferential wall were observed during experiments. Remark that visual access to radial positions of less than 30 mm is restricted by the static bottom end wall as shown in FIG. 12. A digital tachometer (model 470, TESTO) was placed horizontally with the beam pointing through a hole pierced through the static cover of the stainless steel shaft. Additionally, a readout connected to the flow meter was accommodated to be also recorded during experiments.

The video image from the digital camera was displayed in a screen located at a convenient position to be continuously monitored during the experiments. The data simultaneously observed and recorded in the video were gas volumetric flow rate, bed height and rotor angular velocity.

The air volumetric flow rate was controlled via a PID controller (model Compact V2, SIEMENS). The parameters of the PID were set according to the self-oscillation method. The maximum air mass flow rate was 17.5 g/s, which corresponded to an air inlet velocity of 82 m/s. In the absence of solids the rotor started to rotate at an air mass flow rate of 7.0 g/s, which corresponded to an air inlet velocity of 41 m/s. Both particle-free and particulate flow experiments were restricted to this air mass flow rate range. Experiments with higher air mass flow rates are however considered feasible. Even though the rotational velocity of the rotor at the upper limit of the abovementioned air mass flow rate range exceeded 1050 rad/s (10000 revolutions per minute), at the end of this exemplary experiment there were no visual signs of deformation of the rotor and/or detachment of the fins.

The air volumetric flow rate was set $5.6 \cdot 10^{-3}$ m$^3$ s$^{-1}$, which corresponds to an air mass flow rate of 12 g/s and a gas inlet velocity of 62 m/s. At those conditions the pressure at the gas inlet jacket varied from 114 to 115 kPa.

The gravimetric feeder delivered a batch of solids with a total mass between 50 to 100 g into the inlet assembly of the injector screw. The solids consisted of pinewood with average pellet density of 500 kg m$^{-3}$ and maximum dimension of 1.5 mm.

A pressure between 125 and 130 kPa was set in the metallic enclosure that surrounds the gravimetric feeder.

The injector screw was driven at rotational velocities of 50-100 rad/s. The presence of a solid bed in the chamber was confirmed by visual inspection through the transparent glass viewports.

The solid injector was turned off once a certain solids loading was reached. Subsequently the pressure in the enclosure that surrounds the gravimetric feeder was set to a value lower than that in the chamber to prevent solid in the injector screw from reaching the chamber.

The gas volumetric flow rate was set to the values indicated by the experimental plan. Subsequently the video and the pressure data acquisition system were simultaneously started. Data acquisition and video recording were simultaneously stopped after 60-120 s.

This procedure was repeated with the same solids loading for four different air mass flow rates. Experiments were carried out with different solids loadings varying from 0.7 to 5.9 g as well as for particle-free flow.

Then, the solid feeding system was depressurized and the gas volumetric flow rate was set at $8.3 \cdot 10^{-3}$ m$^3$ s$^{-1}$. At this condition the rotor stopped and the gas volumetric flow rate was increased to $5.6 \cdot 10^{-3}$ m$^3$ s$^{-1}$ to entrain the solids that remained in the chamber.

Finally, the mass of solids retained in the bag filter was measured and the chamber was open to inspect the mechanical integrity of the rotor.

At the end of each exemplary experiment, the visual access through the viewports was slightly occluded. This indicated that small amounts of dust were present in the gap between the static end wall and the rotor. Pressurized air was blown through the hole used for measuring rotational velocity until the visual access to the chamber was cleared.

Figure 13:
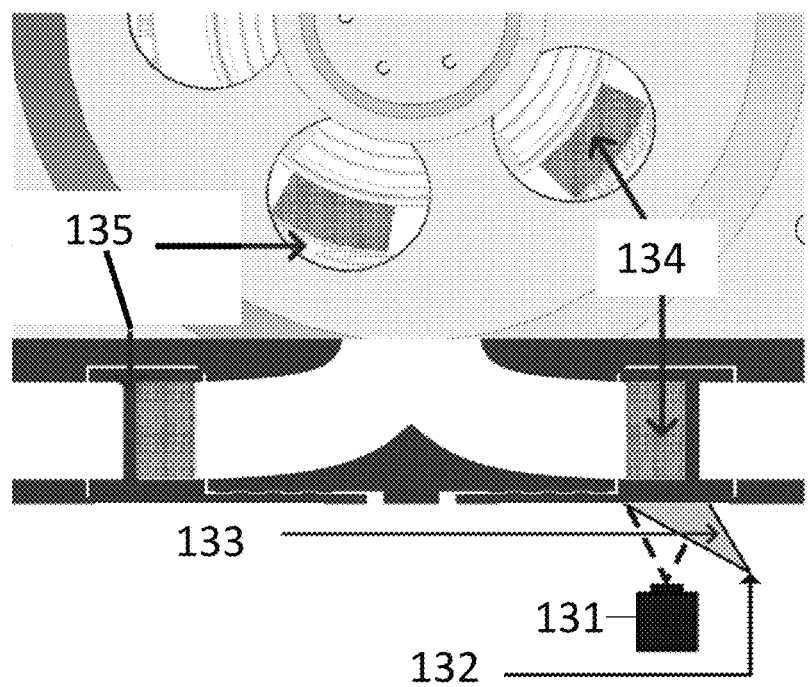
FIG. 13 shows a setup for two-dimensional particle image velocimetry in an example for illustrating embodiments of the present invention.

In addition to the abovementioned experiments, two-dimensional particle image velocimetry (2D PIV) measurements were carried out to assess the azimuthal velocities of the solid bed and whether they differ from the azimuthal velocity of the rotor. The 2D PIV device was equipped with a 4 MP CCD camera 131 (ImagerProX4M) and a 135 mJ, 15 Hz, Nd:YAG Litron laser. A set of optics was used to direct the diffused laser light 132, e.g. double pulsed diffused laser light, towards the viewport, and the PIV camera was set perpendicular to the bottom end wall to take images of the illuminated particles of the solid bed 134, e.g. held on the rotor outer circumferential wall 135, as shown in FIG. 13. The number of pixels per solid particle varied from 200 to 3000. Thus, a PIV test section 133 is defined by the setup.

Figure 14:
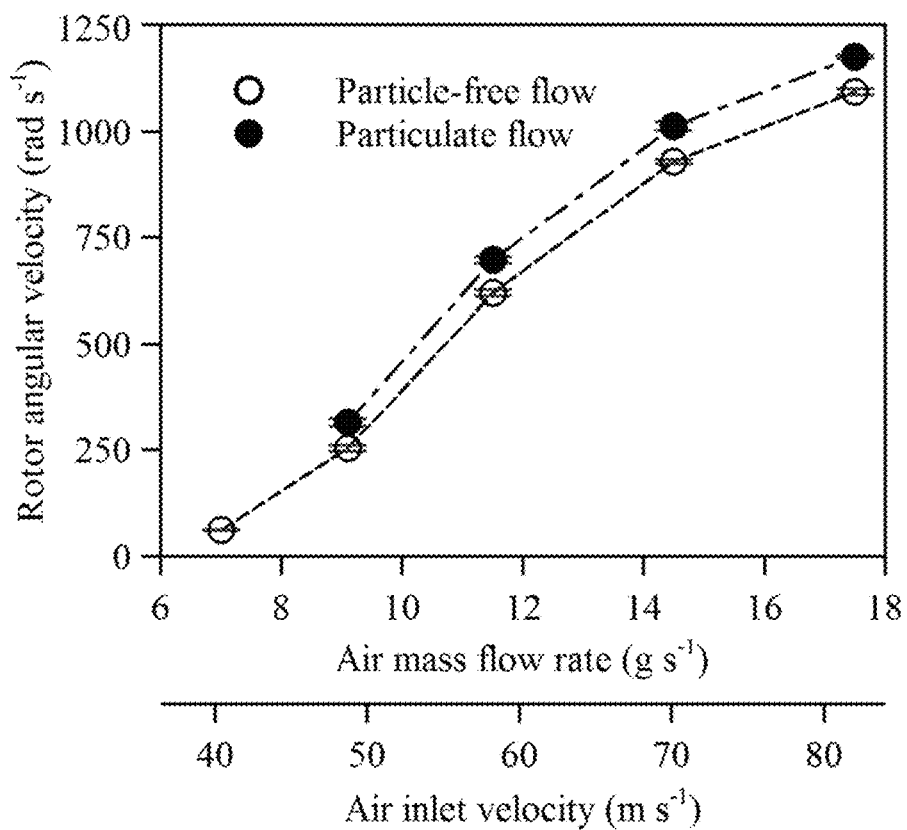
FIG. 14 shows the rotational velocity of the rotor for both particle-free and particulate flow as a function of the air inlet velocity and air mass flow rate, in an example for illustrating embodiments of the present invention.

FIG. 14 shows the rotational velocity of the rotor for both particle-free and particulate flow with a solids loading of 5.9 g. The air inlet velocity in the secondary x-axis of FIG. 14 was calculated taking into account that the cross-sectional area of the main gas inlet is a rectangle of 15 mm height and 9 mm width. The reduction of the cross-sectional area at the connection of the gas feeding line to the jacket increases the velocity of the incoming fresh air. In addition, there is a 1 mm gap between the blades and the jacket outer wall which allows air circulation around the jacket. This 1 mm gap is a first attempt to find a compromise between the momentum transferred to the rotor and the pressure azimuthal symmetry in the jacket.

The total mass of the rotor is 98 g; a solids loading of 5.9 g represents a 6% increase in mass with respect to the particle-free flow case. A visual inspection of the bed indicated that the height of the bed slightly fluctuates around 9 mm. For that bed height and an average pellet density of 450-500 kg m$^{-3}$ the calculated bed void fraction varies from 0.56 to 0.61. The rotor angular velocity increased with increasing air mass flow rate following a sigmoidal-type curve for both particle-free and particulate flow. The rotor angular velocity for particulate flow was higher than that for particle-free flow. The difference in angular velocity between particulate and particle-free flow increased from 62 to 77 rad/s when the air mass flow rate increased from 9.1 to 11.5 g/s. This air mass flow rate range corresponded to air inlet velocities of 51 and 62 m/s. For the last two air mass flow rates, i.e., 14.5 and 17.5 g/s, which corresponded to respective air inlet velocities of 72 and 82 m/s, the difference in angular velocity between particulate and particle-free flow stabilized around 82 rad/s.

Figure 15:
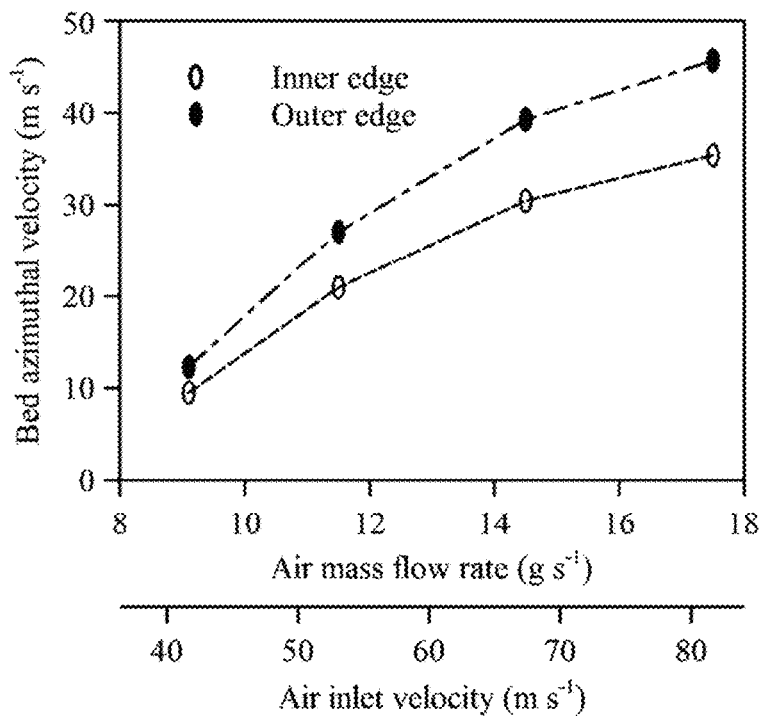
FIG. 15 shows calculated solid bed azimuthal velocities as a function of air inlet velocity and air mass flow rate, in an example for illustrating embodiments of the present invention.

PIV results, which are discussed further hereinbelow, showed that the average difference in azimuthal velocity between the rotor and the solid bed was 3%. Thus, the angular velocities in FIG. 14 are a first indication of the angular velocities of the solid bed. The calculated solid bed azimuthal velocities at the inner and outer edges, i.e., at radial positions of 31 and 40 mm, are shown in FIG. 15. Calculations take into account the 3% observed difference between the rotor and the bed azimuthal velocities. The radial-dependent centrifugal acceleration calculated at the center of the solid bed, i.e., at a radii of 35.5 mm, varies from 340 to 4710 times the Earth's gravitational acceleration.

Figure 16:
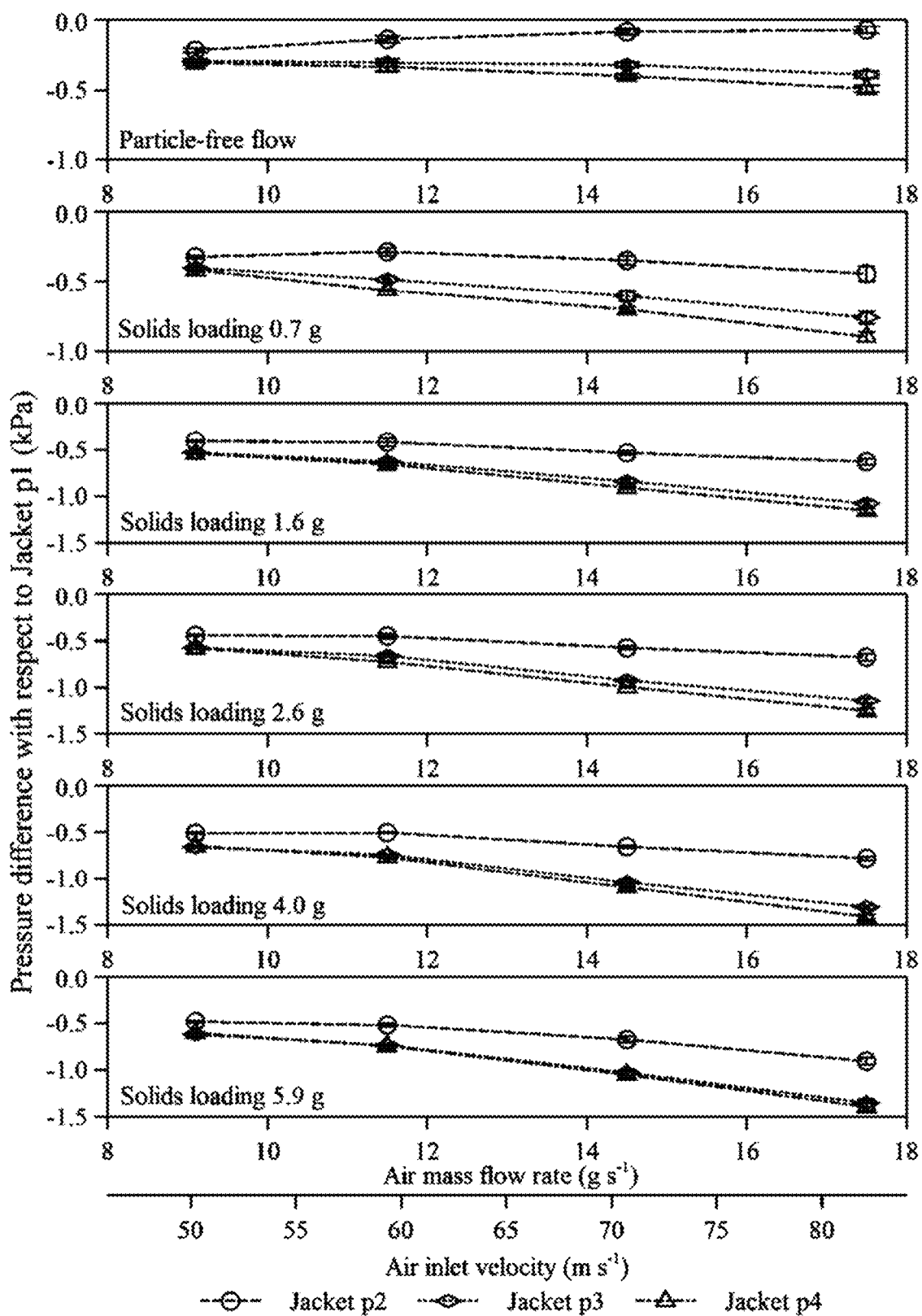
FIG. 16 shows the pressure distribution in the gas inlet jacket for particle-free flow and five exemplary cases of particulate flow, in an example for illustrating embodiments of the present invention.

FIG. 16 shows the pressure distribution in the gas inlet jacket for particle-free flow and five cases of particulate flow. For the latter, the solids loadings varied from 0.7 to 5.9 g. Three differential pressure sensors identified as Jacket p2, p3 and p4 and positioned as indicated in FIG. 11, measured the pressure difference with respect the absolute pressure measured at Jacket p1.

Further hereinbelow, 'pressure difference' refers to the absolute value of the difference. The particle-free flow case showed the lowest pressure differences in the Jacket with values below 0.5 kPa in the full air mass flow rate range. In contrast with the other cases, for particle-free flow the pressure difference at Jacket p2 decreased with increasing air mass flow rate. On the other hand, for particle-free flow the pressure difference at Jacket p3 and p4 increased with increasing air mass flow rate with the latter exhibiting the larger difference. For particulate flow the pressure difference at Jacket p2 were nominally constant within the air mass flow rate range 9.1-11.5 g/s and then increased for larger air mass flow rates. For particulate flow the pressure difference at Jacket p3 and p4 increased with increasing air mass flow rate in the full air mass flow rate range and get closer to each other with increasing solids loading. For the highest solids loading reported in FIG. 16 the pressure differences at Jacket p3 and p4 differed by less than 3% in the full air mass flow rate range. The absolute pressure measured at Jacket p1 increased with increasing air mass flow rate from 108 kPa to 130 kPa. The pressure difference percentage, calculated as the maximum pressure difference divided by the absolute pressure at jacket p1 was lower than 1% for all cases. FIG. 16 indicates a rather minor influence of solids loading and air mass flow rate on the jacket azimuthal symmetry. The single gas feeding line combined with the ejector-like connection and the 1 mm gap between the gas inlet jacket and the rotor blades sufficed for maintaining the pressure azimuthal symmetry in the gas inlet jacket.

Figure 18:
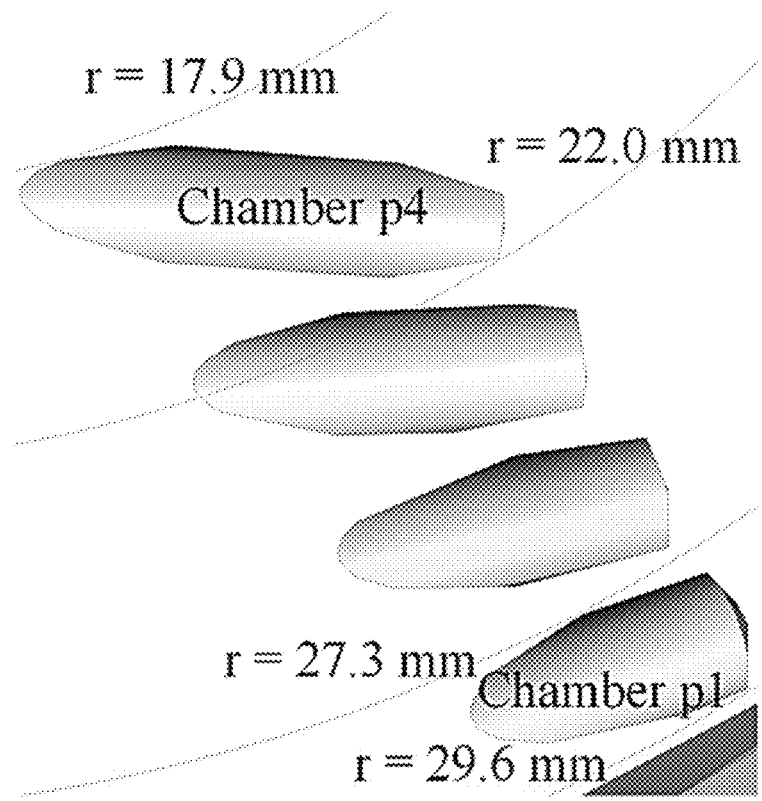
FIG. 18 shows a detailed geometry and the radial locations of the pressure taps relating to the pressure differences illustrated in FIG. 17, in an example for illustrating embodiments of the present invention.
Figure 17:
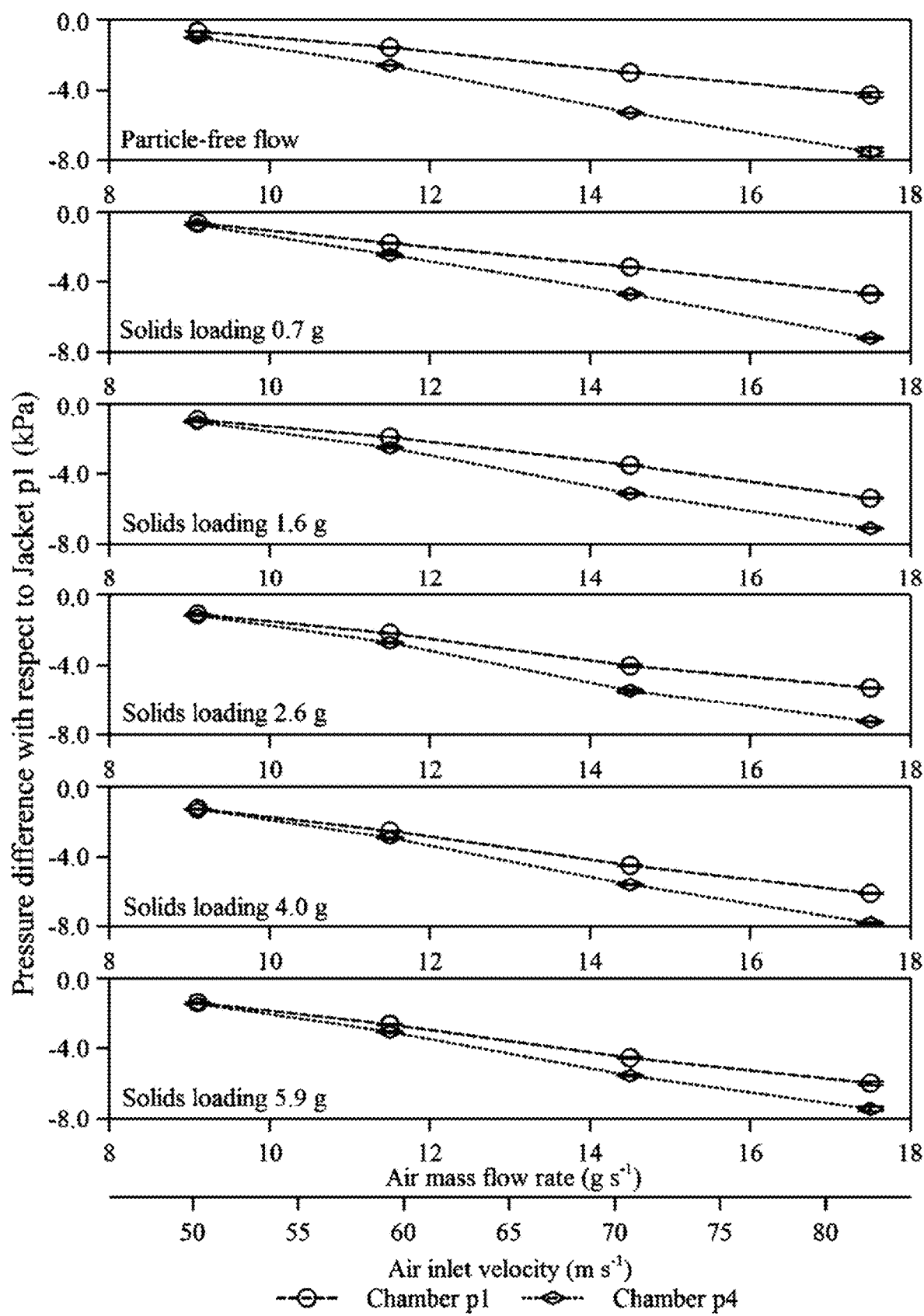
FIG. 17 shows the pressure differences with respect to Jacket p1 at Chamber p1 and Chamber p4, in an example for illustrating embodiments of the present invention.

FIG. 17 shows the pressure differences with respect to Jacket p1 at Chamber p1 and Chamber p4 (see FIG. 11). The detailed geometry and radial location of the corresponding pressure taps are shown in FIG. 18. The opening of the pressure tap corresponding to chamber p1 spans the radial locations 27.3 to 29.6 mm, i.e., its average radial position is 28.5 mm. Conversely, the opening of the pressure tap corresponding to chamber p4 spans the radial locations 17.9 to 22.0 mm, i.e., its average radial position is 20.0 mm.

For the particle-free flow case, the pressure difference at Chamber p1 is mainly caused by the contact with the rotor. For particle-free flow the pressure difference at Chamber p1 increased from 0.6 to 4.3 kPa with increasing air mass flow rate from 9.1 to 17.5 g/s. For the same air mass flow rate range and the highest solids loading the pressure difference at Chamber p1 increased by a factor of 2.1-1.4 compared to particle-free flow. In the full solids loading range and for the lowest air mass flow rate, i.e., for 9.1 g/s, particulate flow showed deviations of less than 20% in pressure difference between Chamber p1 and Chamber p4. For particulate flow as the air mass flow rate increased, the deviation in pressure differences between Chamber p1 and Chamber p4 increased between 25 and 50%. Additionally, for particle-free flow the deviation in pressure difference between Chamber p1 and Chamber p4 was notably higher, reaching an increment of 75%. This indicates that the pressure in the vicinity of the rotor of the chamber was less sensitive to changes in air mass flow rate in the presence of a solid bed.

Figure 19:
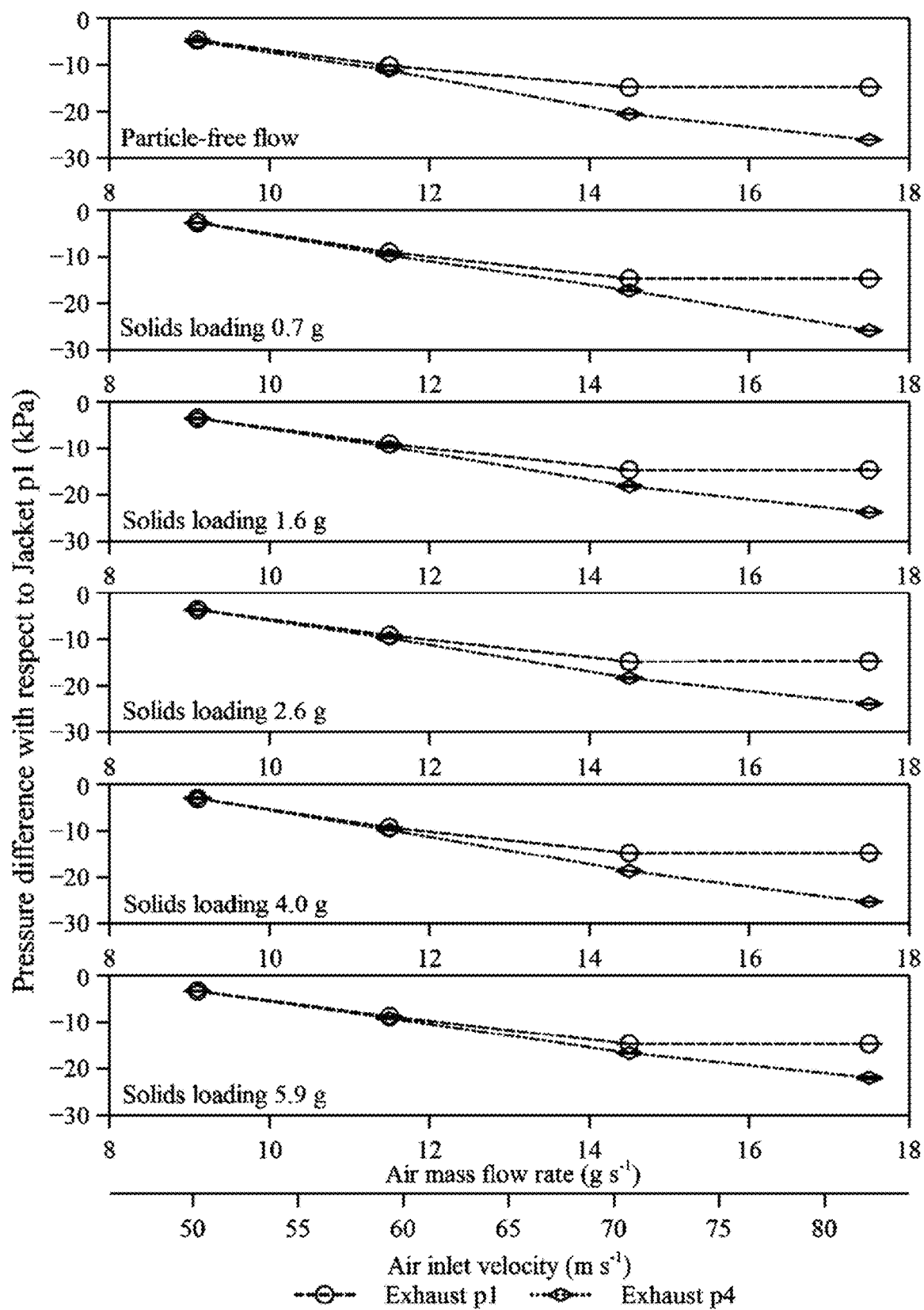
FIG. 19 shows the pressure differences with respect to Jacket p1 at the locations Exhaust p1, p2, p3 and p4, in an example for illustrating embodiments of the present invention.
Figure 20:
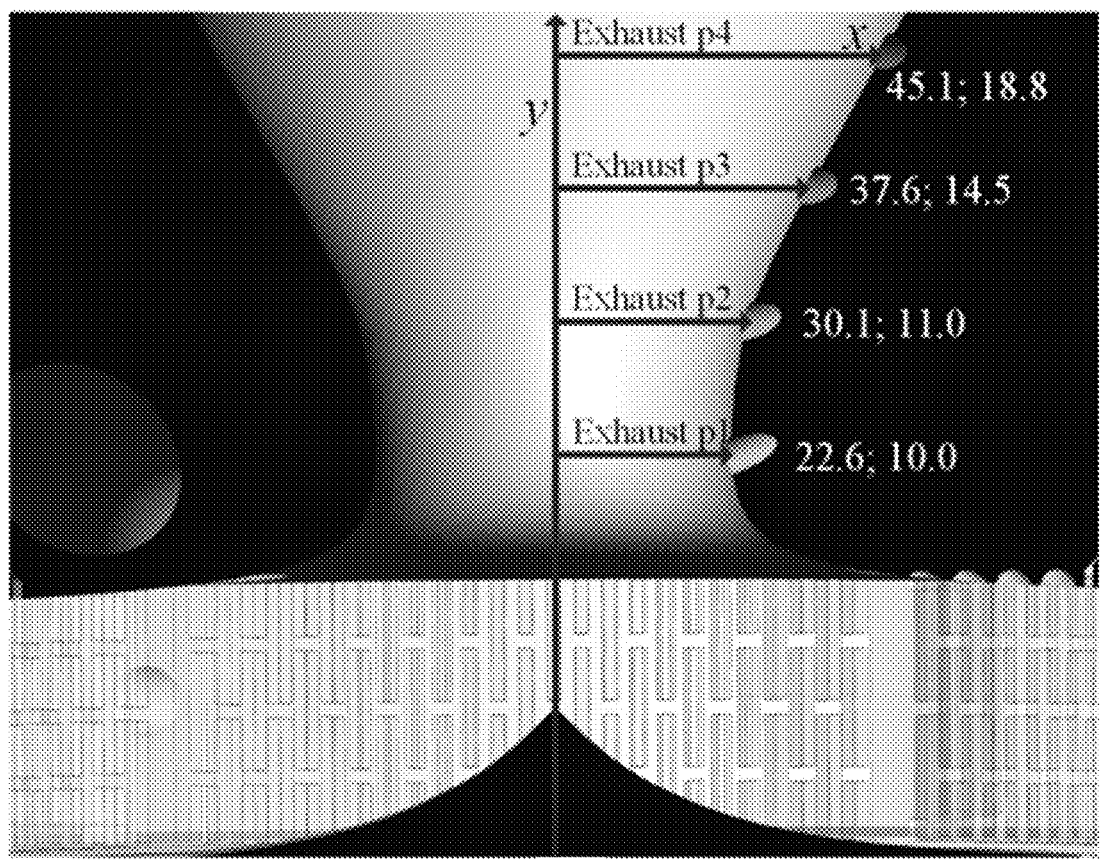
FIG. 20 shows the locations of the pressure taps relating to the pressure differences illustrated in FIG. 19, in an example for illustrating embodiments of the present invention.

FIG. 19 shows the pressure differences with respect to Jacket p1 at the locations Exhaust p1, p2, p3 and p4 (see FIG. 11). The locations of these pressure taps are shown in FIG. 20. The pressure tap corresponding to exhaust p1 is located at the throat of the exhaust, i.e., the axial position with the lowest cross-sectional area. The exhaust throat is located at 22.6 mm starting from a horizontal plane at the bottom of the solid bed. The last three taps span the axial locations 22.6-45.1 mm and the radial locations 10-18.8 mm. For the particle-free flow case, the pressure difference at Exhaust p1 increased from 4.6 to 14.7 kPa with increasing air mass flow rate from 9.1 to 14.5 g/s, i.e., a 3.2 times increment. An analogous behavior was observed at Exhaust p1 for all the particulate flow cases with a 4.6 times average increment in pressure difference. On the other hand both particle-free and particulate flow cases did not show additional pressure drop at Exhaust p1 with increasing air mass flow rate from 14.5 to 17.5 g/s. Both particle-free and particulate flow cases showed a continuous increment in pressure difference at Exhaust p4 in the full range of air mass flow rate. However, the pressure difference between Exhaust p4 and Exhaust p1 was always of less than 1 kPa in the air mass flow rate range 9.1-14.5 g/s. With further increasing air mass flow rate to 14.5 g/s, the pressure difference between Exhaust p4 and Exhaust p1 was 5.7 kPa for particle-free flow and an average value of 3.0 kPa for particulate flow. Conversely, with increasing the air mass flow rate from 14.5 to 17.5 g/s the particle-free flow case showed and additional pressure drop of 11.3 kPa while the corresponding average value for the particulate flow cases was 9.5 kPa. Two important observations from these results are: 1) there is a remarkable pressure drop between Exhaust p1 and Exhaust p4 for air mass flow rates higher than 14.5 g/s and 2) the pressure drop between Exhaust p1 and Exhaust p4 is significantly higher for particle free flow.

Figure 21:
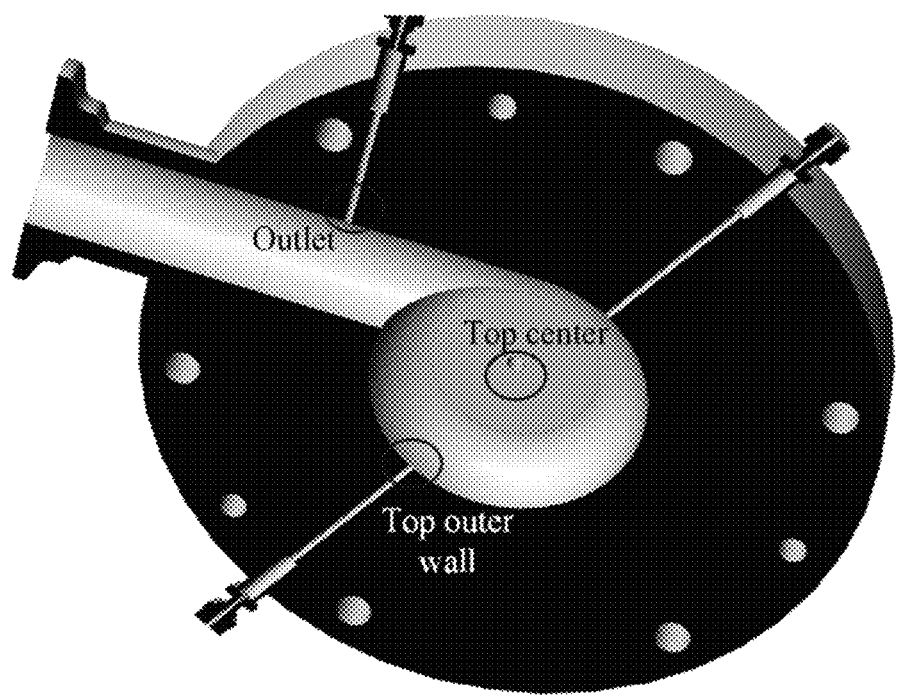
FIG. 21 shows the locations of the pressure taps relating to the pressure differences illustrated in FIG. 22, in an example for illustrating embodiments of the present invention.
Figure 22:
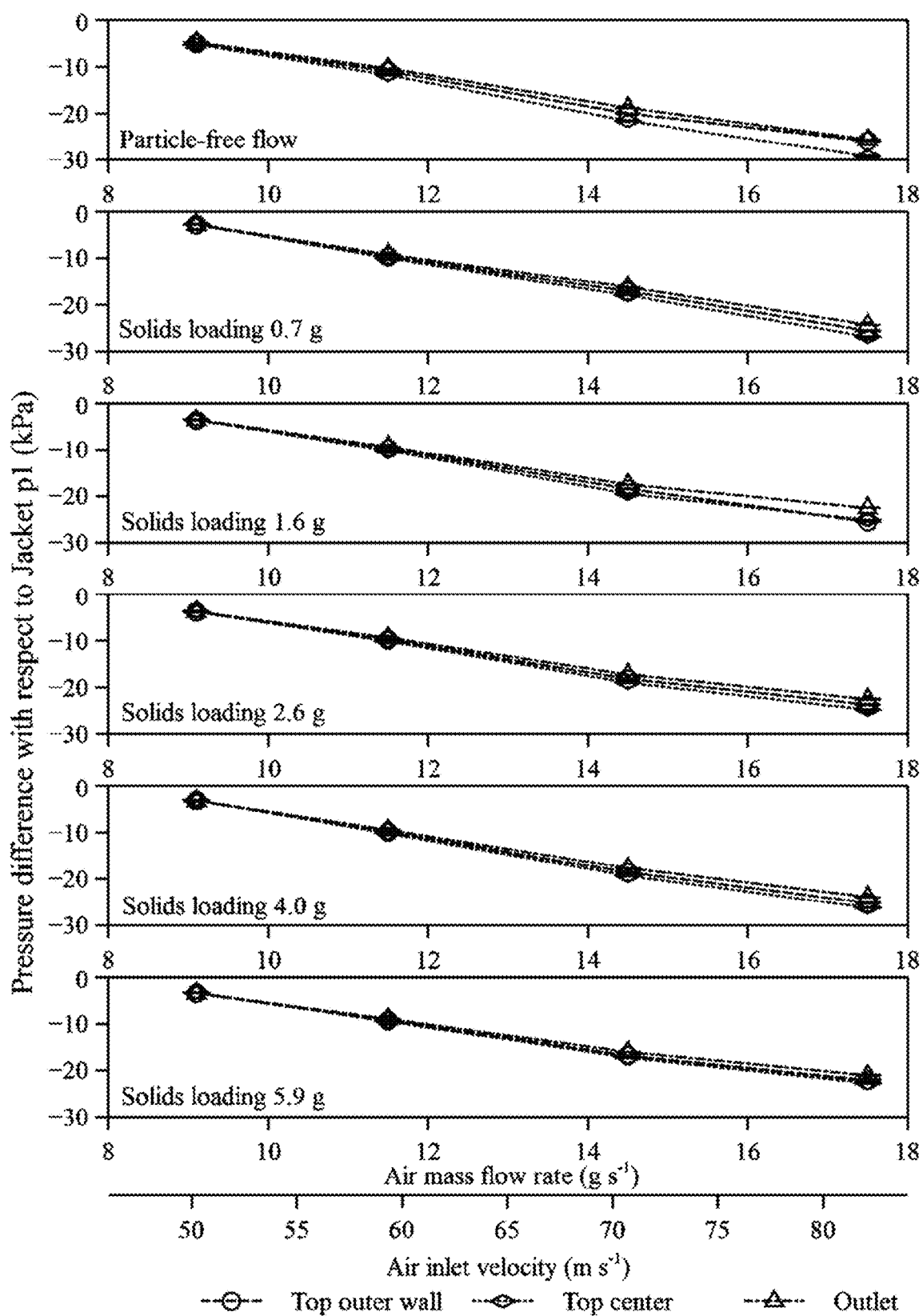
FIG. 22 shows the pressure differences with respect to Jacket p1 at the locations 'Top Outer Wall', 'Top Center' and at the outlet line, in an example for illustrating embodiments of the present invention.

FIG. 22 shows the pressure differences with respect to Jacket p1 at the taps located at the Top outer wall, Top center and at the Outlet line. Absolute pressure was measured at the Top center and at the Outlet line, while differential pressure with respect to Jacket p1 was measured at the Top outer wall. The locations of these pressure taps are shown in FIG. 21. The Top outer wall tap is located at 72.0 mm with respect to a horizontal plane at the bottom of the solid bed and at a radii of 32 mm. The pressure at the top center was always lower than the pressure at the top outer wall and the outlet line. The pressure between Top center and Outlet increased with increasing air mass flow rate but decreased with increasing solids loading. This low-pressure region is consistent with a swirling flow in the diverging exhaust. The low-pressure region is expected to extend around the central axis of the diverging outlet but also displaced upward through the exhaust away from the chamber due to the presence of the profiled bottom end wall.

Figure 23:
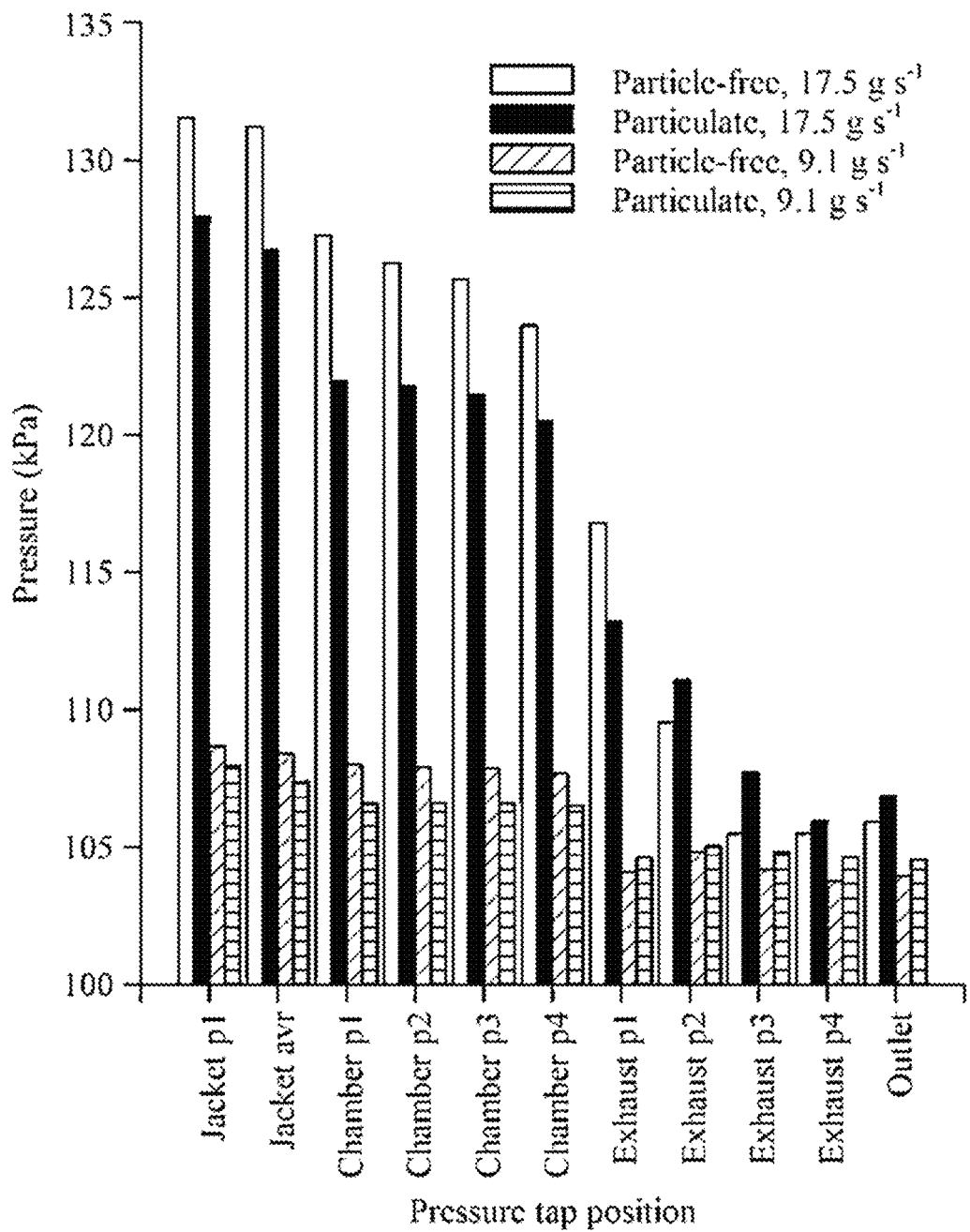
FIG. 23 shows a pressure profile for particle-free and particulate flow, in an example for illustrating embodiments of the present invention.

FIG. 23 shows the pressure profile through the chamber for particle-free and particulate flow with a solids loading of 5.9 g, under the lowest and the highest air mass flow rates (i.e., 9.1 and 17.5 g/s). Absolute pressures were calculated by deducting the respective pressure drops from the absolute pressure at Jacket p1. Particle-free flow exhibited a higher total pressure drop compared to that for particulate flow in the full experimental air mass flow rate range. While for particle-free flow the total pressure drop increased from 4.7 to 25.6 kPa with increasing air mass flow rate from 9.1 to 17.5 g/s, the corresponding total pressure drop for particulate flow increased from 3.4 to 21.1 kPa.

For particle-free flow there was an increment in absolute pressure in the diverging exhaust although the locations where that pressure increment occurred varied with air mass flow rate. For the lowest air mass flow rate, i.e., 9.1 g/s, pressure recovery was detected between Exhaust p1 and Exhaust p2. However, pressure dropped again between Exhaust p2 and Exhaust p3. For the highest air mass flow rate, i.e., 17.5 g/s, pressure recovery was detected between the positions Exhaust p3 and Outlet. Regarding pressure recovery in the diverging exhaust, particulate flow showed results comparable to those for particle-free flow for the lowest air mass flow rate. For the highest air mass flow rate, pressure recovery was observed between Exhaust p4 and Outlet. The recovery of kinetic energy into pressure in the diverging exhaust was barely detected and negligible for practical purposes. FIG. 23 reveals the contribution of the diverging exhaust to the total pressure drop. For the highest air mass flow rate the pressure drop between Exhaust p1 and Outlet was 43% of the total pressure drop for particle-free flow and 30% for particulate flow.

Figure 24:
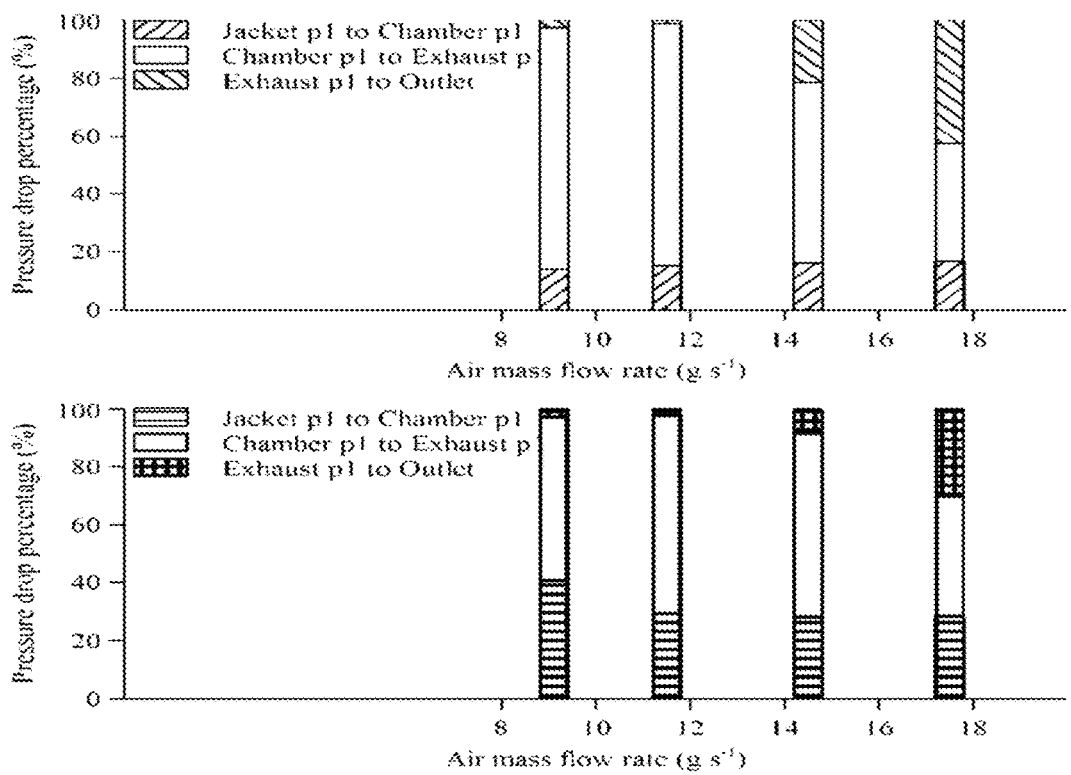
FIG. 24 shows the contribution of three sections of a device in accordance with embodiments of the present invention to the total pressure drop for particle-free flow and for particulate flow, in an example for illustrating embodiments of the present invention.

For convenience of the pressure profile analysis the device in accordance with embodiments of the present invention can be divided into three main sections, namely Jacket p1-to-Chamber p1, Chamber p1-to-Exhaust p1 and Exhaust p1-to-Outlet. FIG. 24 shows the contribution of these sections to the total pressure drop for particle-free flow and the particulate flow case with the highest solids loading. For air mass flow rates of up to 15.1 g/s, the last section, i.e., Exhaust p1-to-Outlet had a marginal contribution of less than 3%. A comparable result was observed for both particle-free and particulate flow. By increasing the air mass flow rate to 14.5 g/s, the last section accounted for 21 and 8% of the total pressure drop for particle-free and particulate flow, respectively. Finally, by further increasing the air mass flow rate to 17.5 g/s the last section accounted for 43 and 30% of the total pressure drop for particle-free and particulate flow, respectively. The central section of the device, i.e., Chamber p1 to-Exhaust-p1 account for the largest contribution to the total pressure for both particle-free and particulate flow. Remark that for air mass flow rates from 9.1 to 11.5 g/s, the rotor angular velocity at the highest solid loading varied from 316 to 697 rad/s. This angular velocity range corresponds to solid bed azimuthal velocities at the inner edge of the bed of 10-22 m/s. From a hydrodynamic point of view this relatively low air mass flow rate suffices for stable operation of the device. Remark that this observation only regards to pressure drop because the stability of the operation was not compromised at higher air mass flow rates.

Figure 25:
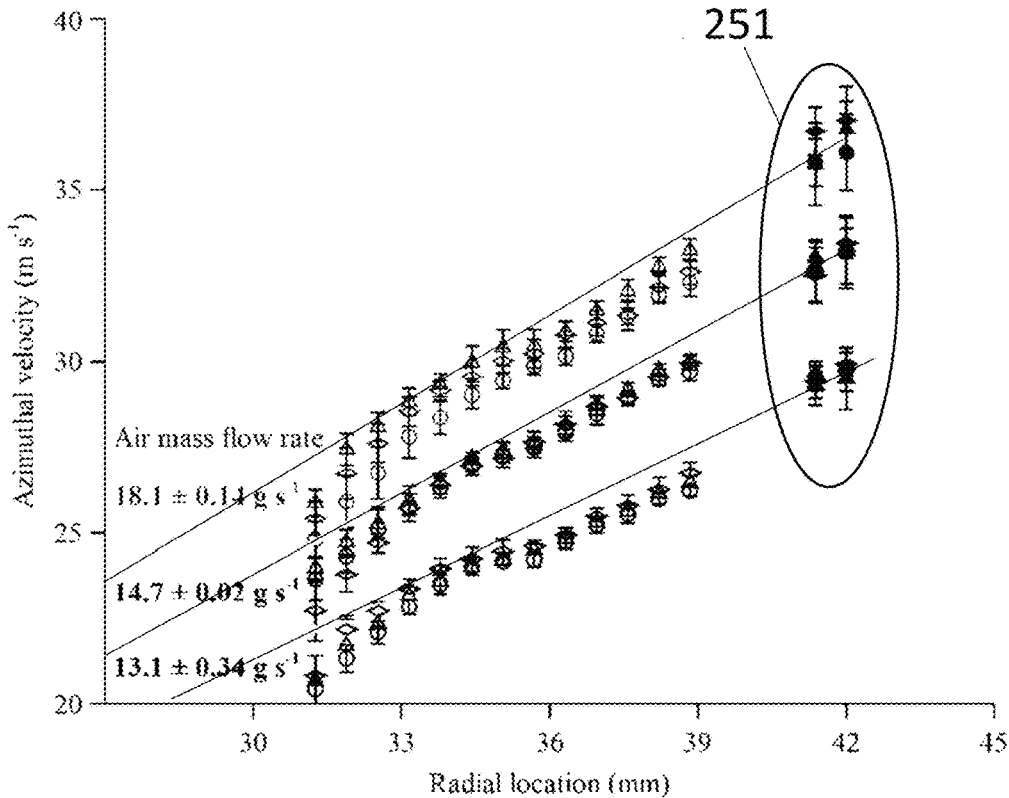
FIG. 25 shows azimuthal velocities measured via PIV for three different air mass flow rates, in an example for illustrating embodiments of the present invention.

FIG. 25 shows the azimuthal velocities measured via PIV for 3 different air mass flow rates. Three repeated experiments of 100 PIV pairs each were carried out for each air mass flow rate. Air mass flow rate fluctuations during the PIV measurements partially explain the relatively high standard deviation of the measurements, especially in the vicinity of the inner edge of the bed and at the rotor circumferential wall 251. Instead of averaging the three PIV measurements for each air mass flow rate, all the data points are shown. PIV measurements were mainly carried out to assess whether the solid bed rotates at the same angular velocity of the rotor. The continuous lines in FIG. 25 represent the azimuthal velocities corresponding to the average azimuthal velocity of the rotor circumferential wall. The solid bed rotates at average azimuthal velocities 3% lower than those indicated by the grey lines. Average deviations of 5% were found for the two radial positions next to the rotor circumferential wall. Whereas average deviations of less than 2% were found at the center of the solid bed.

Figure 26:
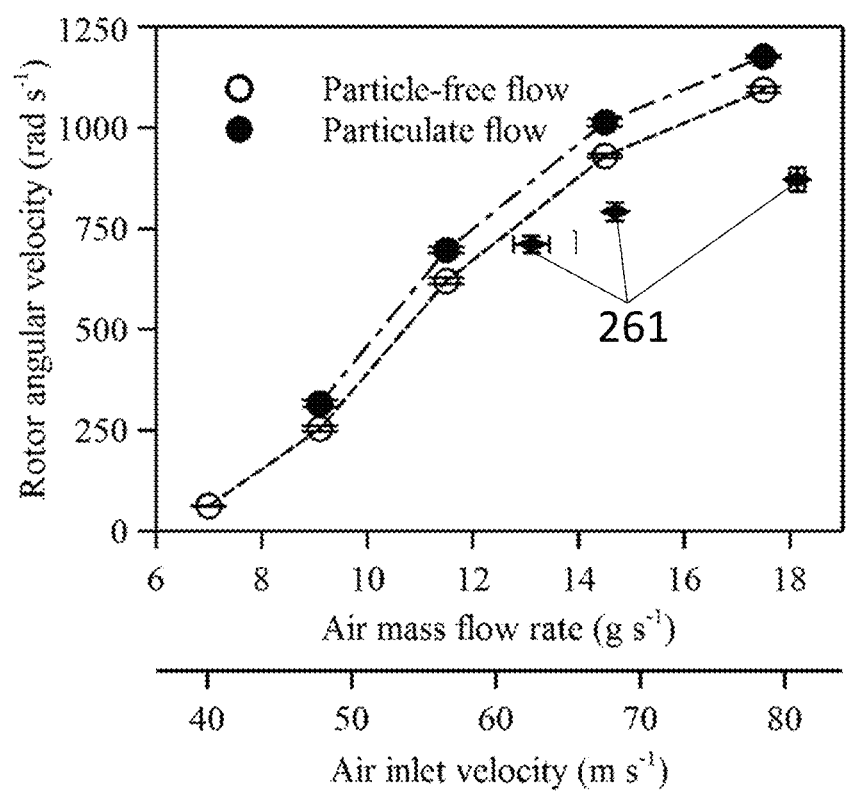
FIG. 26 shows the angular velocity of the rotor obtained from the pressure measurements and from the PIV measurements, in an example for illustrating embodiments of the present invention.

FIG. 26 shows together the rotor angular velocity from the pressure measurements and that from the PIV measurements 261. There is a significant discrepancy between those measurements specially at air mass flow rates higher than 14 g/s. The most likely explanation for that discrepancy is the presence of dust in the gap between the static end wall and the rotor. However, regardless of the source of this discrepancy, this does not invalidate the fact that the solid bed rotates at average azimuthal velocities only 3% lower than those of the rotor.

Figure 27:
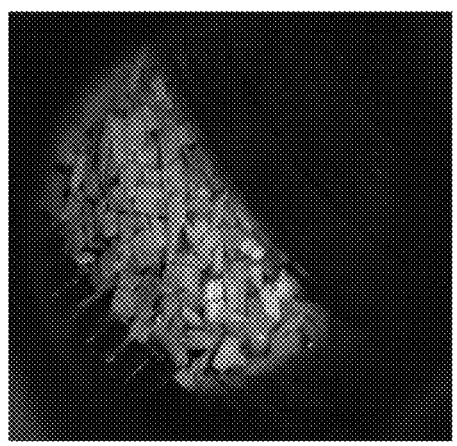
FIG. 27 shows instantaneous particle images obtained via PIV, and corresponding velocity fields, in an example for illustrating embodiments of the present invention.
Figure 27:
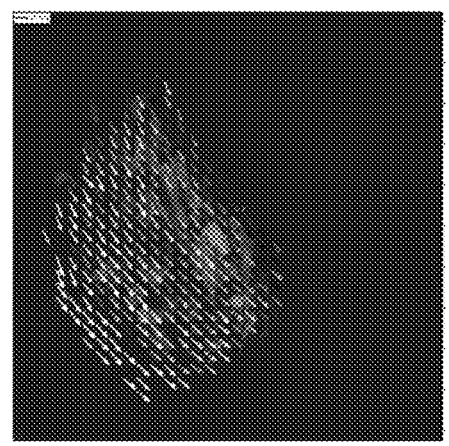
Figure 27:
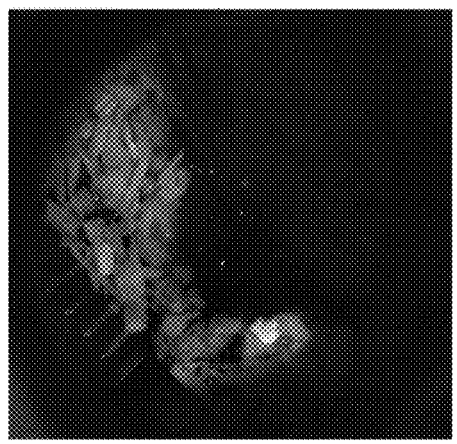
Figure 27:
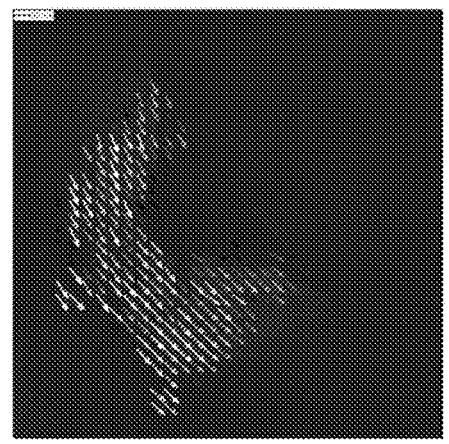
Figure 27:
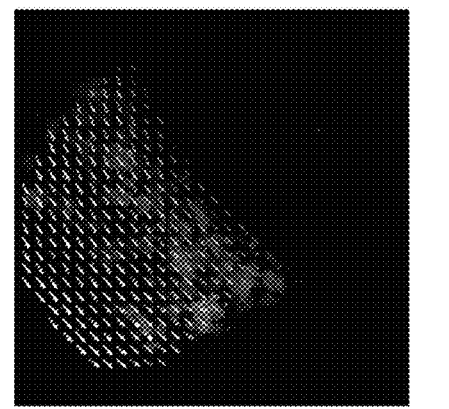

Instantaneous images of the solid bed revealed non-uniformities in the azimuthal direction. This non-uniformities are not evident to the naked eye. FIG. 27 shows instantaneous particle images obtained via PIV, without and with the non-uniformity, for an air mass flow rate of 13.1±0.34 g/s. The instantaneous particle image 271 corresponds to the rotor bed holder being completely filled with particles; a corresponding instantaneous velocity field 273 is also shown. The instantaneous particle image 272 corresponds to the rotor bed holder being partially filled with particles; a corresponding instantaneous velocity field 274 is also shown. The average velocity field 275 from 100 PIV pairs, for the rotor bed holder entirely filled with particles is also shown.

The air is modelled as an ideal gas and the operation is assumed as isothermal. At these conditions the energy balance states that the kinetic energy difference plus the fluid work difference equal the rotational kinetic energy of the rotor and the fluid bed plus the energy dissipated because of friction. However, the initial assumptions also imply that the pressure-to-density ratio remains constant, e.g. the kinetic energy of the air is the only energy input to the system. The rotational kinetic energy of the rotor can be calculated from the rotational velocity and the moment of inertia of the rotor. The moment of inertia was automatically computed in SOLIDWORKS® based on the geometry of the rotor assembly shown in FIG. 4. The moment of inertia of the rotor is $7.158 \cdot 10^{-5}$ kg m$^2$. The presence of the solid bed affects the moment of inertia. However, as a first calculation the effect of the solid bed on the moment of inertia of the rotor was not included. Remark that the mass of the rotor is 98 g and the maximum solids loading represented only a 6% increase in mass with respect to the particle-free flow case for this particular exemplary experiment.

Figure 28:
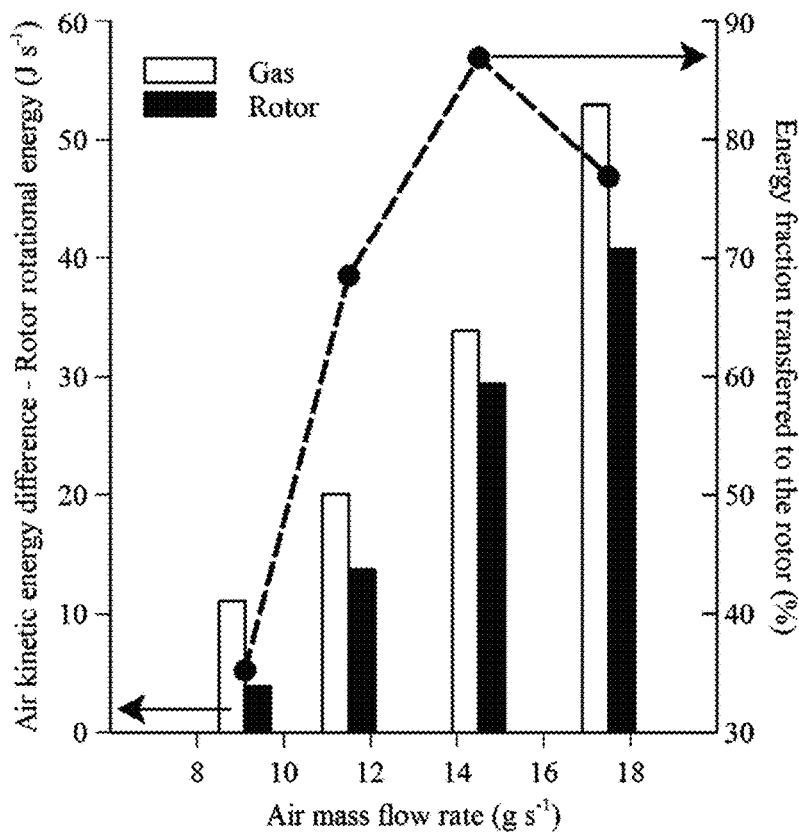
FIG. 28 shows the kinetic energy transferred from the air and the rotational kinetic energy of the rotor for particle-free flow, in an example for illustrating embodiments of the present invention.

FIG. 28 shows the kinetic energy transferred from the air and the rotational kinetic energy of the rotor for particle-free flow. Additionally, FIG. 28 also shows the fraction of the kinetic energy transferred from the air that is transformed into rotational energy of the rotor. That fraction increases with increasing air mass flow rate reaching a maximum for an air mass flow rate of 14.5 g/s, which corresponds to an air injection velocity of 72 m/s. For this maximum the fraction of kinetic energy transferred from the air that is converted into kinetic rotational energy amounts to 87%. The lowest energy recovery was 35% and occurred at the lowest air mass flow rate. With increasing the air mass flow rate from 14.5 to 17.5 g/s, the energy recovery dropped from its maximum value of 87% to 77%.

Figure 29:
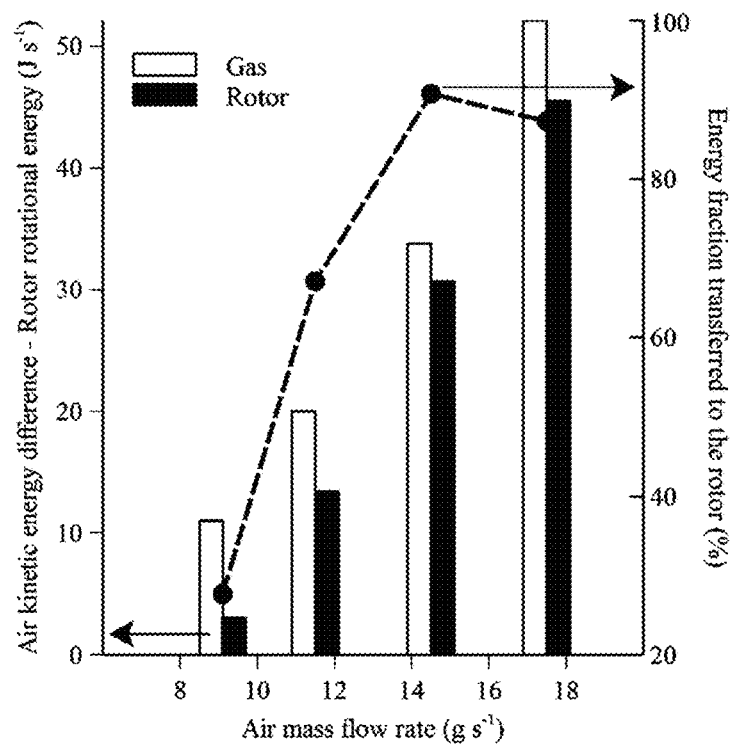
FIG. 29 shows the kinetic energy transferred by the air and the rotational kinetic energy of the rotor for particulate flow, in an example for illustrating embodiments of the present invention.

FIG. 29 shows the kinetic energy transferred by the air and the rotational kinetic energy of the rotor for particulate flow with a solids loading of 1.6 g. It is to be noted that the rotational kinetic energy includes the moment of inertia which is expected to change in the presence of the solid bed. Consequently the comparison between FIG. 28 and FIG. 29 is only qualitative. The trends observed for particle-free flow still holds.

In this example, the centrifugal fluidization device in accordance with embodiments of the present invention has been tested within a wide air mass flow rate and solids loading ranges. The rotor angular velocity increased with increasing air mass flow rate following a sigmoidal-type curve for both particle-free and particulate flow. The rotor angular velocity for the latter was higher than that for particle-free flow. The difference in angular velocity between particulate and particle-free flow increased from 62 to 77 rad/s when the air mass flow rate increased from 9.1 to 11.5 g/s. This air mass flow rate range corresponded to air inlet velocities of 51 and 62 m/s. For the last two air mass flow rates, i.e., 14.5 and 17.5 g/s, which corresponded to respective air inlet velocities of 72 and 82 m/s, the difference in angular velocity between particulate and particle-free flow stabilized around 82 rad/s. PIV showed that the average difference in azimuthal velocities between the rotor and the solid bed is 3%.The calculated solid bed azimuthal velocities at the inner and outer edges vary from 10 to 40 m/s. The radial-dependent centrifugal acceleration at the center of the solid bed varies from 340 to 4710 times the earth gravitational acceleration.

Particle-free flow exhibited a higher total pressure drop compared to that for particulate flow in the full experimental air mass flow rate range. For particle-free flow the total pressure drop increased from 4.7 to 25.6 kPa with increasing air mass flow rate from 9.1 to 17.5 g/s. The corresponding total pressure drop for particulate flow increased from 3.4 to 21.1 kPa. The recovery of kinetic energy into pressure in the diverging exhaust was barley detected and was always of less than 2 kPa. For air mass flow rates of up to 15.1 g/s, the diverging exhaust showed a marginal contribution of less than 3% to the total pressure drop. A comparable result was observed for both particle-free and particulate flow. By increasing the air mass flow rate to 14.5 g/s, the diverging exhaust accounted for 21 and 8% of the total pressure drop for particle-free and particulate flow, respectively. By further increasing the air mass flow rate to 17.5 g/s the last section accounted for 43 and 30% of the total pressure drop for particle-free and particulate flow, respectively.

An energy balance shows that 35-87% of the kinetic energy transferred by the air is converted into rotational kinetic energy. That percentage increases with increasing air mass flow rate reaching a maximum for an air mass flow rate of 14.5 g/s, which corresponds to an air injection velocity of 72 m/s.

Figure 30:
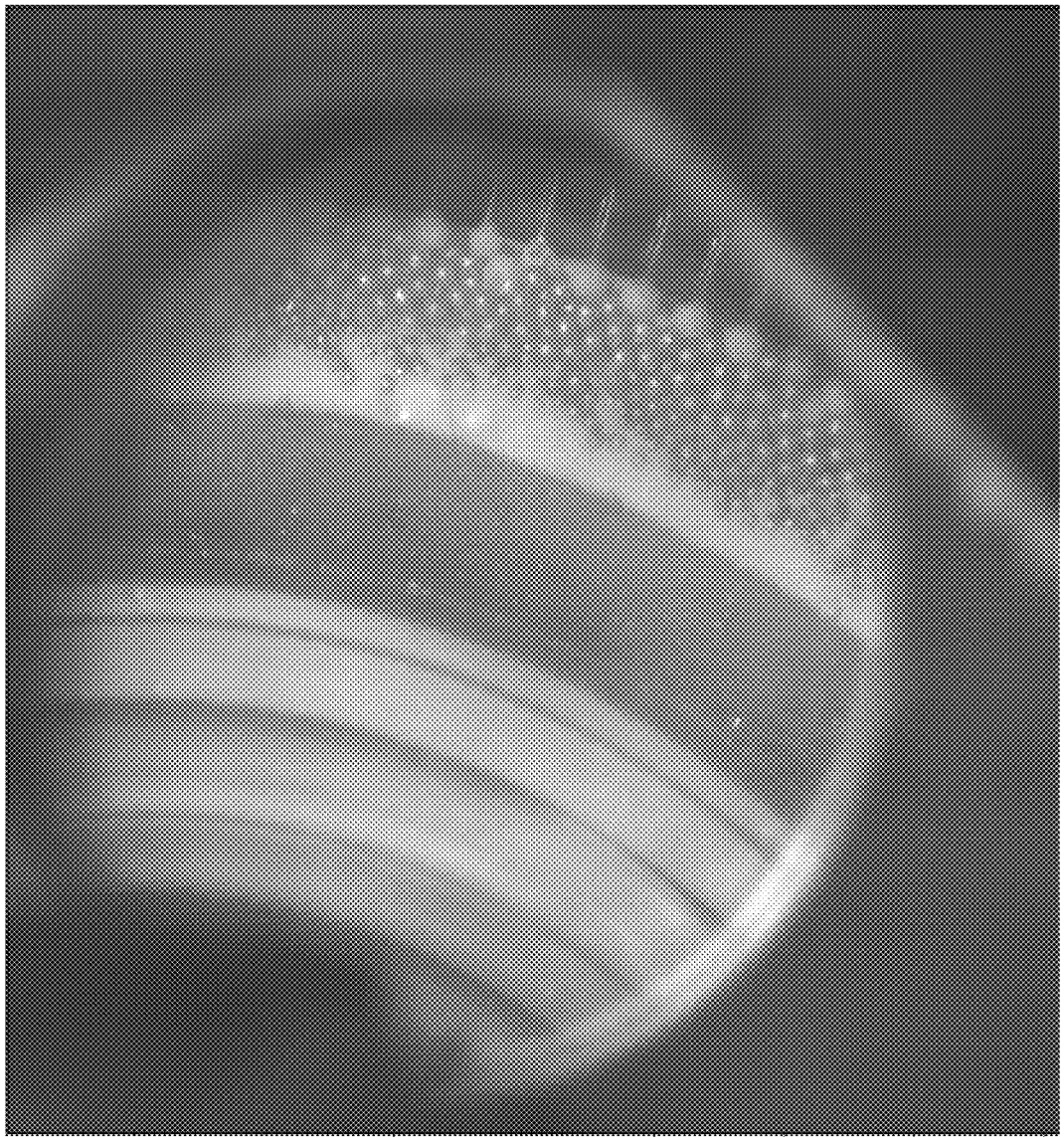
FIG. 30 shows a rotating target medium driven by a carrier fluid in an example illustrating embodiments of the present invention.

In an example, illustrating embodiments of the present invention, FIG. 30 shows the rotating target medium (Al and $Al_2O_3$ particle), driven by the carrier fluid (air) of flow mass rate 11.8 g/s. The bed consists of four layers of spherical particles of respectively: (i) 1 mm diameter $Al_2O_3$ (10 g), (ii) 0.7 mm diameter Al (10 g), (iii) 0.5 mm diameter Al (10 g), and (iv) from 0.05 to 0.150 mm diameter $Al_2O_3$ powder (10 g). The bed of a total mass of 40 g was rotating steady and stable.

The invention claimed is:

1. A device for bringing a solid-phase or liquid target medium into contact with a carrier fluid in a process that requires intensive interfacial momentum, mass and/or energy exchange between the carrier fluid and the target medium, the device comprising:
a chamber comprising a circumferential wall, a bottom wall and a top wall, said chamber forming an enclosure for said target medium while contacting said carrier fluid in operation of said device, said chamber being substantially rotationally symmetric with respect to an axis of symmetry, said chamber being adapted for remaining mechanically static in operation of said device;
at least one fluid inlet adapted for injecting said carrier fluid under pressure into said chamber, wherein an injection direction of the carrier fluid is substantially tangential to an inner surface of said circumferential wall;
an outlet for letting the carrier fluid flow out of the chamber, and a fluid distributor arranged in said chamber and comprising a perforated cylindrical wall, said fluid distributor being adapted for diverting said injected carrier fluid to pass through said perforated cylindrical wall in a substantially radial inward direction with respect to said axis of symmetry, said fluid distributor being substantially rotationally symmetric with respect to said axis of symmetry and adapted for rotating around said axis of symmetry, a contact region between the target medium and the carrier fluid being delimited by and extending from the perforated cylindrical wall in said radial inward direction,
a rotatable shaft for rotating around said axis of symmetry, said rotatable shaft being mechanically linked to said fluid distributor to rotatably mount said fluid distributor in said chamber,
wherein said fluid distributor comprises at least one fin extending from said fluid distributor in a substantially radial outward direction with respect to said axis of symmetry, the at least one fin being arranged for converting kinetic energy of the injected carrier fluid into rotational energy of the fluid distributor while redirecting the injected carrier fluid to pass in said substantially radial inward direction through perforations of said perforated cylindrical wall,
wherein at least a part of said bottom wall of the chamber is formed by a bottom plate that is arranged centrally around said axis of symmetry in a plane perpendicular to said axis of symmetry and that is mechanically decoupled from said fluid distributor such as to remain mechanically static when said fluid distributor rotates around said axis of symmetry, and
wherein said fluid distributor further comprises a linkage structure for mechanically linking said rotatable shaft to said fluid distributor, said linkage structure comprising a plate that is oriented perpendicular to said shaft, said plate being grooved such as to form a labyrinth fluid seal in conjunction with said bottom plate.

2. The device of claim 1, said device being adapted for forming a rotating bed of said target medium and said carrier fluid upon rotation of said fluid distributor about said axis of symmetry, wherein said rotating bed forms on an inner surface of the cylindrical wall.

3. The device of claim 1, wherein said at least one fin is curved, having a free end portion distal from said fluid distributor and angularly shifted with respect to a fixed end portion proximal to said fluid distributor, said angular shift being an angular shift around said axis of symmetry against the direction of flow in which said carrier fluid is injected into said chamber by said at least one fluid inlet in operation of said device.

4. The device of claim 1, wherein said at least one fin comprises at least three fins uniformly distributed around a circumference of said fluid distributor.

5. The device of claim 1,
wherein the bottom plate is arranged inside the fluid distributor and a gap is formed in a radial direction between an outer diameter of the bottom plate and a lower base portion of the fluid distributor.

6. The device of claim 1, wherein said bottom plate is rotationally symmetric with respect to said axis of symmetry and is tapered such as to extend toward the top wall in a central region of said bottom plate and away from said top wall in a peripheral region of said bottom plate.

7. The device of claim 1, wherein said rotatable shaft comprises an external bearing at its outer surface, configured to engage a corresponding cuff formed in a housing of said chamber.

8. The device of claim 1,
wherein said rotatable shaft is a hollow shaft,
wherein said rotatable shaft comprises an internal bearing at its inner surface, configured to engage a spindle that is coaxially provided inside said rotatable shaft, said spindle being mechanically linked to said bottom plate.

9. The device of claim 1, wherein said at least one fluid inlet comprises a nozzle formed in said circumferential wall, said nozzle having a first wall section that connects continuously and tangentially to said inner surface of said circumferential wall and a second wall section that connects to said inner surface of said circumferential wall at an acute angle such as to focus a flow of said injected carrier fluid azimuthally along said inner surface of said circumferential wall.

10. The device of claim 1, wherein the chamber is a cylindrical chamber with a height-to-diameter ratio of at most five.

11. The device of claim 1, wherein the perforations of the perforated cylindrical wall form an H-shaped slit pattern.

12. A system comprising the device of claim 1 and a pressure regulator connectable to a supply of pressurized carrier fluid, the pressure regulator being capable of regulating a mass flow of the carrier fluid through the at least one fluid inlet at a rate sufficient to cause a rotary motion of the fluid distributor.

13. A method for bringing a target medium into contact with a carrier fluid in a process that requires intensive interfacial momentum, mass and/or energy exchange between the carrier fluid and the target medium, the method comprising:
  feeding said target medium into a chamber adapted for containing said target medium while contacting said carrier fluid, said chamber being substantially rotationally symmetric with respect to an axis of symmetry and adapted for remaining mechanically static while performing said method;
  injecting said carrier fluid under pressure into said chamber, said injecting being substantially tangential to an inner surface of a circumferential wall of said chamber;
  passing the injected carrier fluid in a substantially radial inward direction through a perforated cylindrical wall of a fluid distributor rotatably mounted in said chamber;
  letting said carrier fluid flow out of said chamber;
  preventing leakage of the carrier fluid from the chamber by disposing a fluid labyrinth seal between a bottom plate of the chamber and a grooved plate of a linkage structure for mechanically linking a rotatable shaft to said fluid distributor, said bottom plate being arranged centrally around said axis of symmetry in a plane perpendicular to said axis of symmetry and mechanically decoupled from said fluid distributor such as to remain mechanically static when said fluid distributor rotates around said axis of symmetry, and said grooved plate being oriented perpendicular to said shaft;
  feeding the target medium into a contact region delimited by and extending from the perforated cylindrical wall in said radial inward direction; and
  deflecting the injected carrier fluid on at least one fin extending from said fluid distributor in a substantially radial outward direction, thereby converting kinetic energy of the injected carrier fluid into rotational energy of the fluid distributor, wherein said at least one fin deflects and redirects the injected carrier fluid to pass in said substantially radial inward direction through perforations of said perforated cylindrical wall.

14. A device for bringing a solid-phase or liquid target medium into contact with a carrier fluid in a process that requires intensive interfacial momentum, mass and/or energy exchange between the carrier fluid and the target medium, the device comprising:
  a chamber comprising a circumferential wall, a bottom wall and a top wall, said chamber forming an enclosure for said target medium while contacting said carrier fluid in operation of said device, said chamber being substantially rotationally symmetric with respect to an axis of symmetry, said chamber being adapted for remaining mechanically static in operation of said device;
  at least one fluid inlet adapted for injecting said carrier fluid under pressure into said chamber, wherein an injection direction of the carrier fluid is substantially tangential to an inner surface of said circumferential wall;
  an outlet for letting the carrier fluid flow out of the chamber; and
  a fluid distributor arranged in said chamber and comprising a perforated cylindrical wall, said fluid distributor being adapted for diverting said injected carrier fluid to pass through said perforated cylindrical wall in a substantially radial inward direction with respect to said axis of symmetry, said fluid distributor being substantially rotationally symmetric with respect to said axis of symmetry and adapted for rotating around said axis of symmetry, a contact region between the target medium and the carrier fluid being delimited by and extending from the perforated cylindrical wall in said radial inward direction;
  wherein said fluid distributor comprises at least one fin extending from said fluid distributor in a substantially radial outward direction with respect to said axis of symmetry, the at least one fin being arranged for converting kinetic energy of the injected carrier fluid into rotational energy of the fluid distributor while redirecting the injected carrier fluid to pass in said substantially radial inward direction through perforations of said perforated cylindrical wall;
  wherein each of a top end portion and a bottom end portion of the cylindrical wall comprises an end-profile that extends radially inwards.

* * * * *